United States Patent
Kahen

(10) Patent No.: US 7,174,935 B2
(45) Date of Patent: Feb. 13, 2007

(54) AUTOMATIC SAFETY TIRE DEVICE

(76) Inventor: Soleyman Kahen, 2215 Tunbridge Ct., Los Angeles, CA (US) 90077

( * ) Notice: Subject to any disclaimer, the term of this patent is extended or adjusted under 35 U.S.C. 154(b) by 0 days.

(21) Appl. No.: 10/701,267

(22) Filed: Nov. 4, 2003

(65) Prior Publication Data
US 2004/0089385 A1    May 13, 2004

(51) Int. Cl.
B60C 11/00    (2006.01)
B60C 27/00    (2006.01)

(52) U.S. Cl. ...................... 152/216; 152/227
(58) Field of Classification Search ............ 152/167, 152/185, 213 R, 216, 225 R, 226–230
See application file for complete search history.

(56) References Cited

U.S. PATENT DOCUMENTS

| | | | | |
|---|---|---|---|---|
| 3,112,784 A | * | 12/1963 | Montenare | 301/47 |
| 4,120,336 A | * | 10/1978 | Baskall | 152/216 |
| 4,355,451 A | * | 10/1982 | Thomas | 152/221 |
| 4,643,251 A | * | 2/1987 | Ziccardi et al. | 152/223 |
| 4,883,104 A | * | 11/1989 | Minami | 152/210 |
| 4,906,051 A | | 3/1990 | Vilhauer, Jr. | |
| 4,960,159 A | * | 10/1990 | Oda | 152/216 |
| 5,070,923 A | | 12/1991 | Tanaka | |
| 5,254,187 A | * | 10/1993 | Metraux | 152/216 |
| 5,501,482 A | | 3/1996 | McClive | |
| 5,540,267 A | * | 7/1996 | Rona | 152/216 |
| 5,645,659 A | | 7/1997 | Ivan | |
| 6,341,635 B1 | | 1/2002 | Robeson | |

* cited by examiner

*Primary Examiner*—Jason R. Bellinger
(74) *Attorney, Agent, or Firm*—Birch, Stewart, Kolasch & Birch, LLP

(57) ABSTRACT

An automotive device for increasing the traction on a supporting surface including a body mountable on a wheel hub and carrying a plurality of radially extending traction arms that are mounted for movement between retracted positions and extended positions in which the outer ends of the arms lie over the tread of the vehicle. Several different embodiments are shown, including L-shaped flexible plastic arms with enlarged outer ends having bumps and openings for increased traction, arcuately curved arms of substantially uniform width, elongated spring coils supported in nozzles for directing the outer ends into extended positions, either across the tread or in a V-shaped configuration over the tread, and others. Automatic actuators include rotary motors driving pinion gears meshing with racks on the traction arms, linear actuators for the spring coils, and others. One embodiment has a special wheel rim mountable on a wheel hub and carrying all of the components of the device, including means for supporting and guiding the traction elements. Automatic remote controls, a heater, battery packs and a generator also are disclosed.

35 Claims, 20 Drawing Sheets

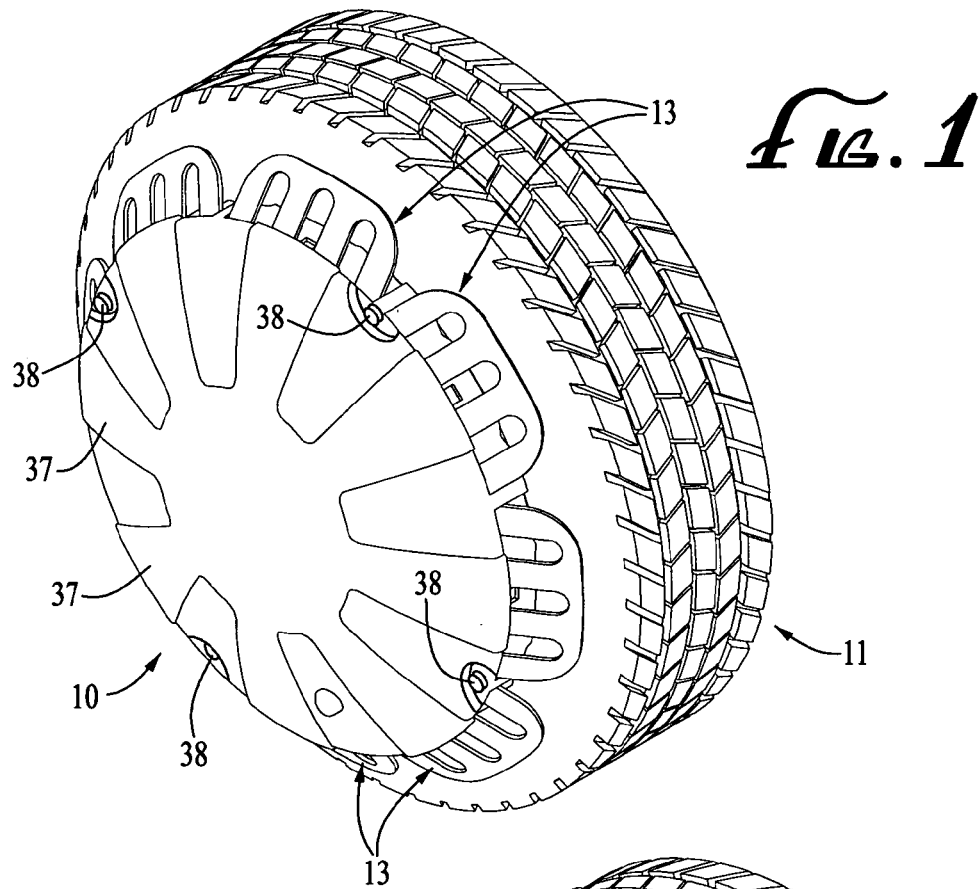
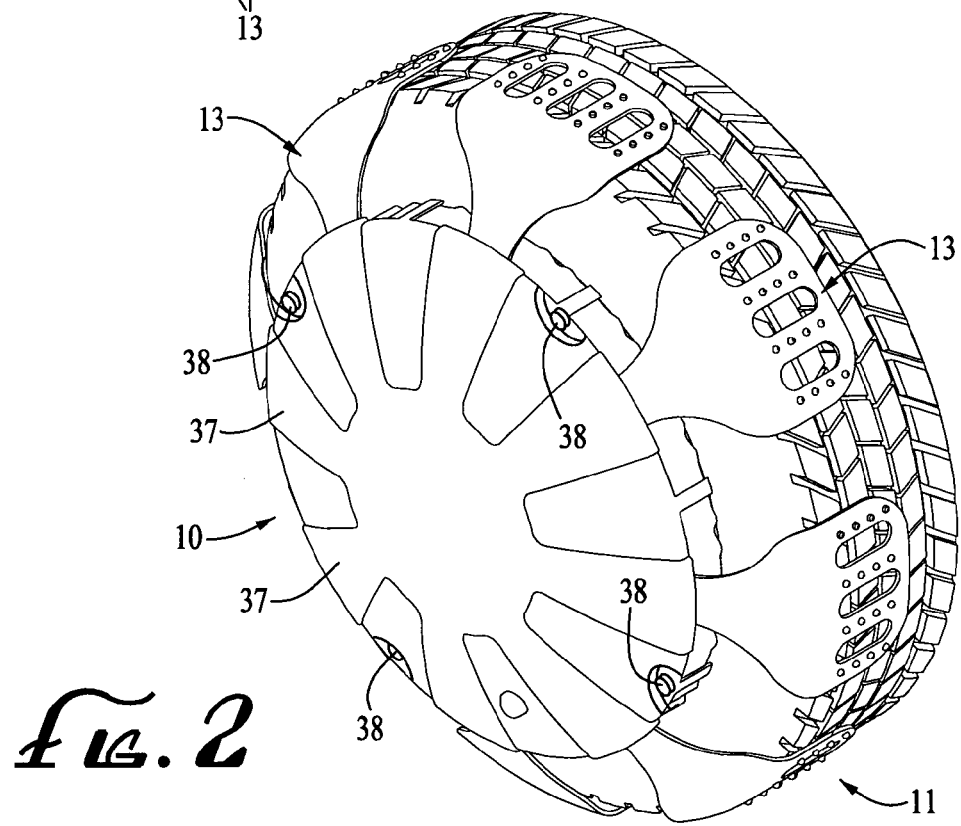

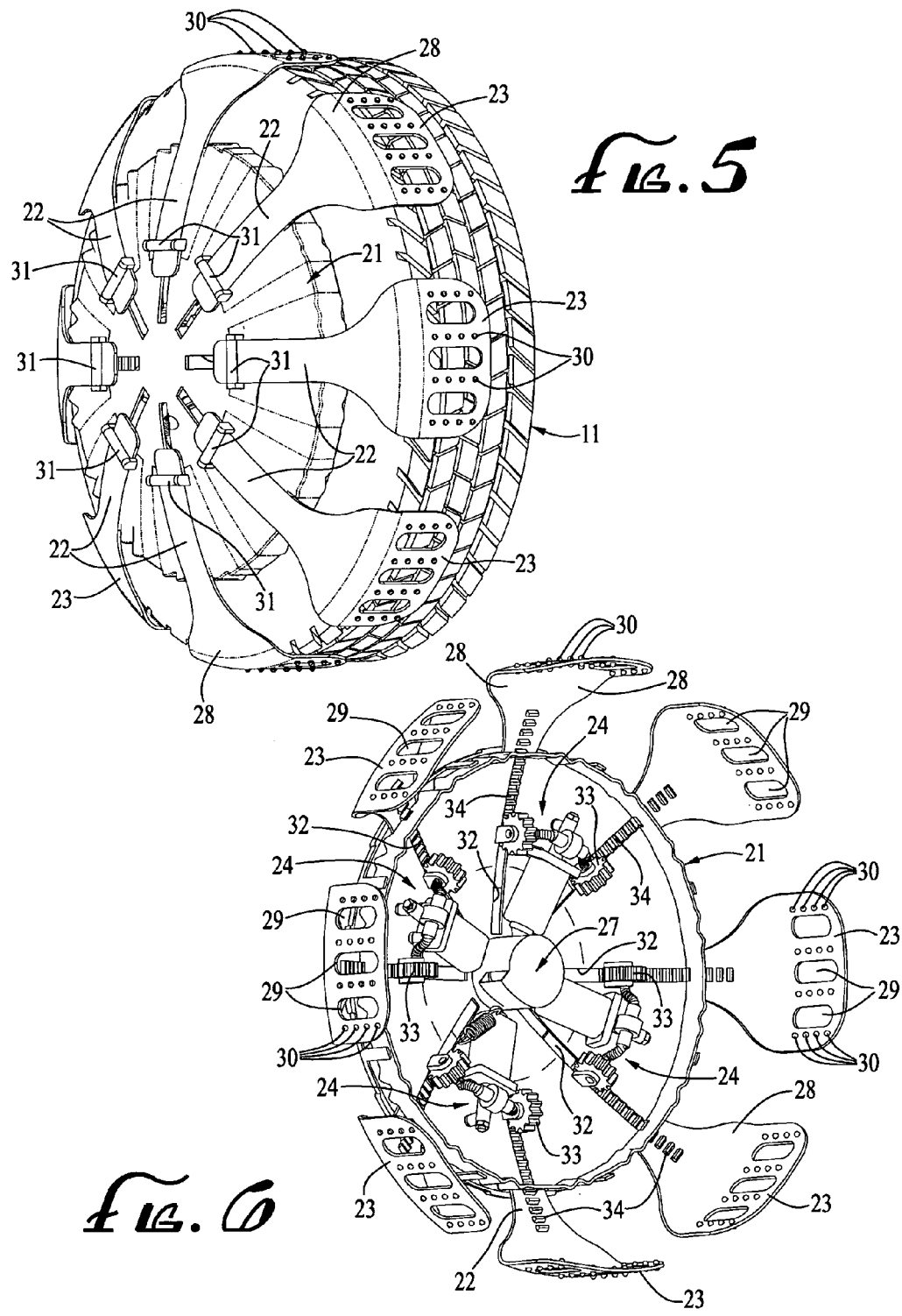

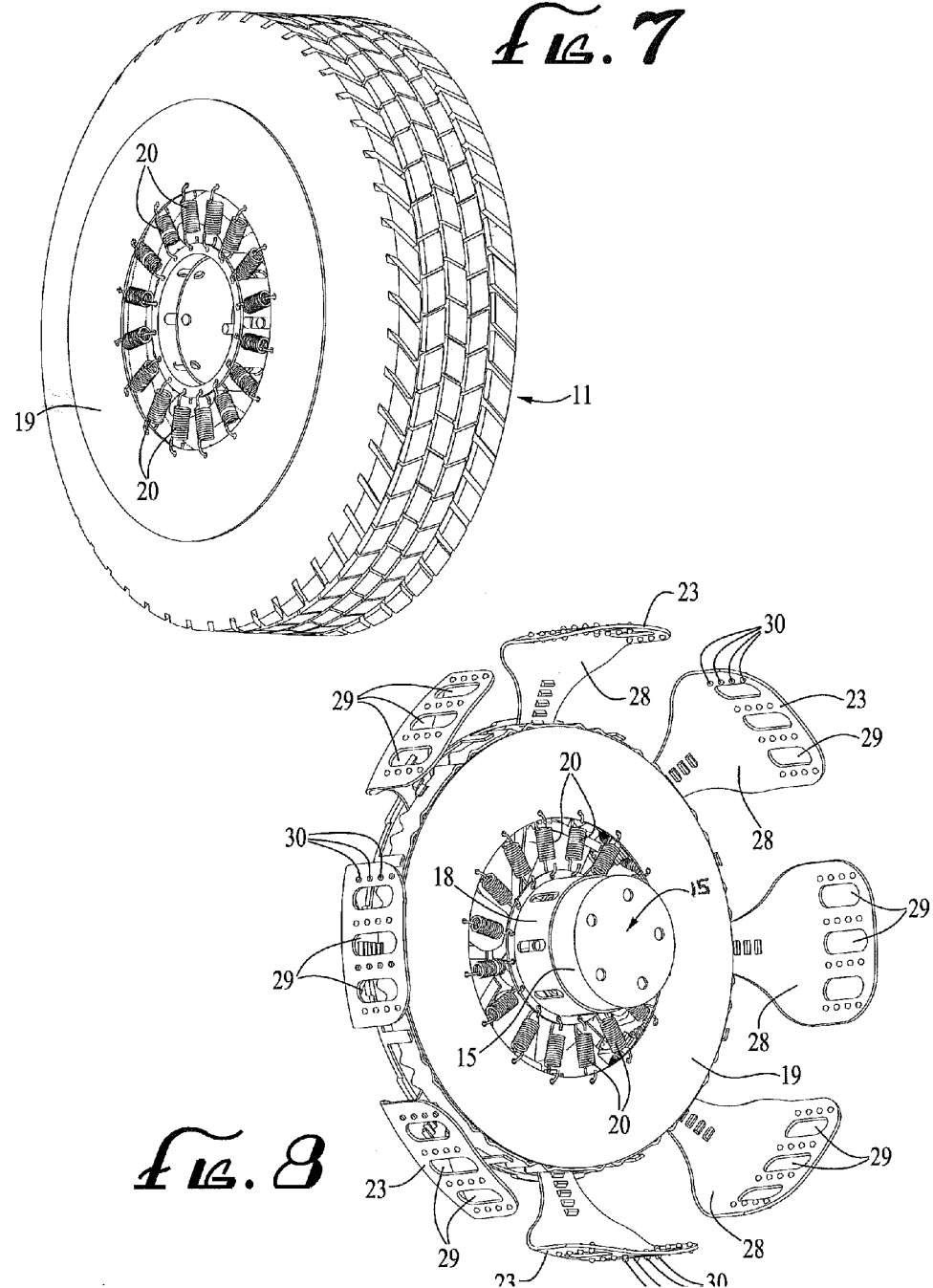

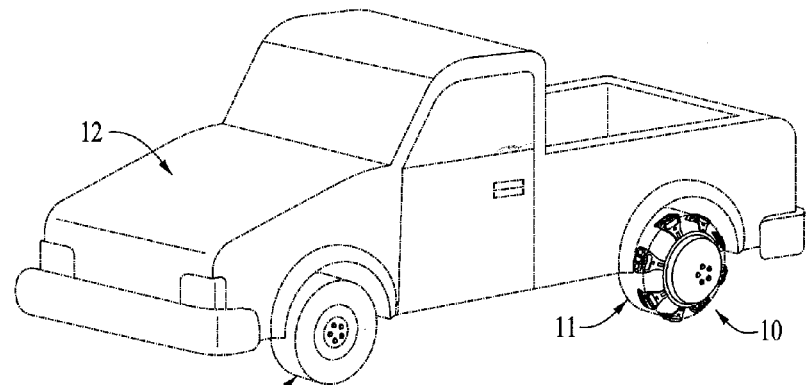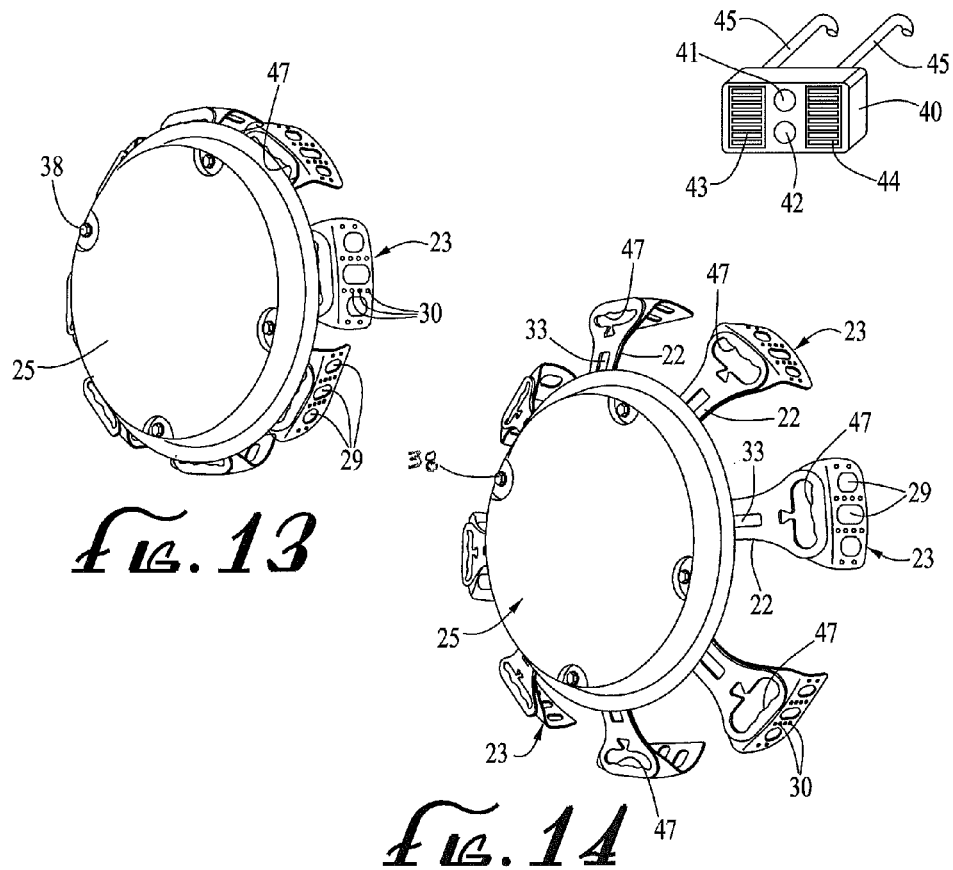

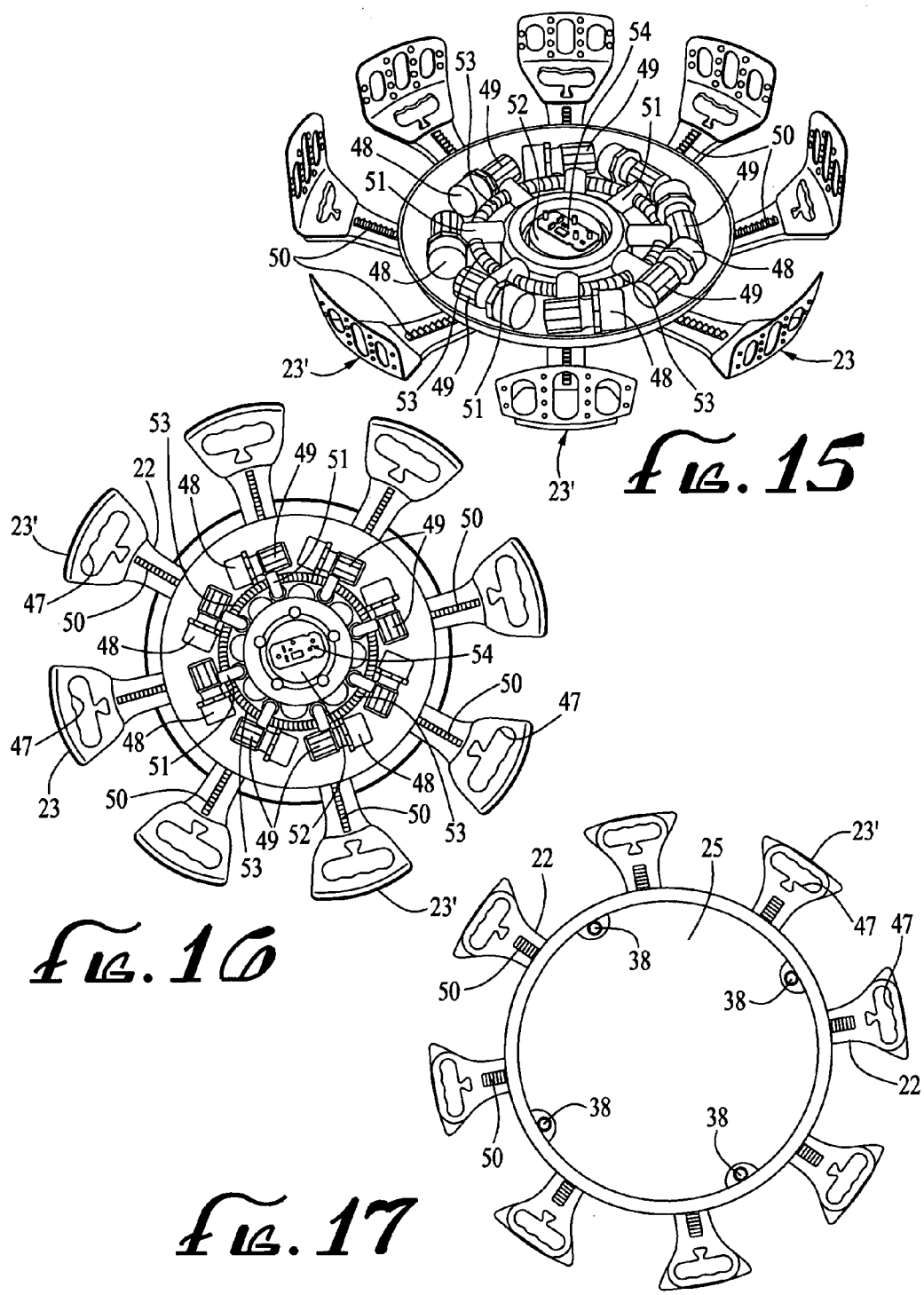

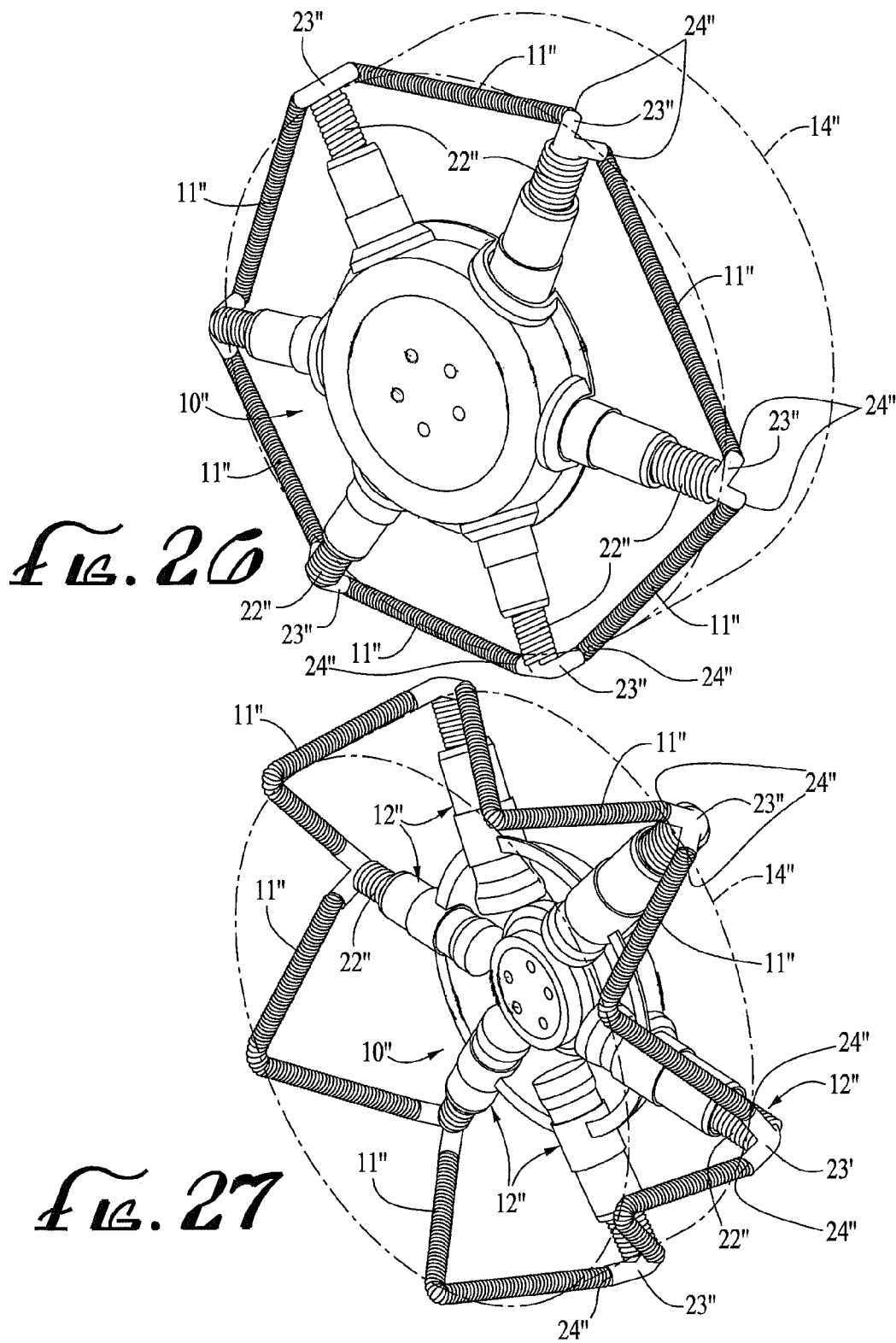

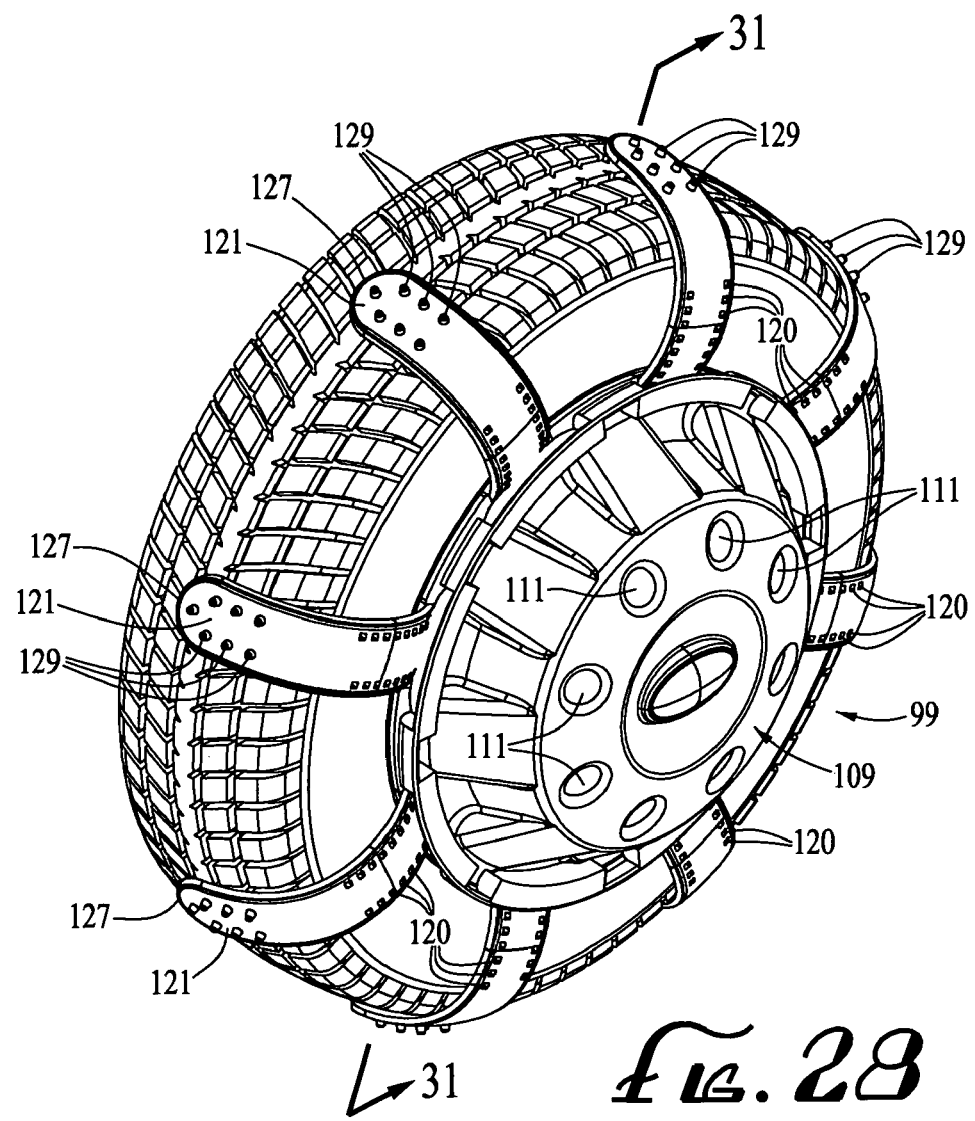

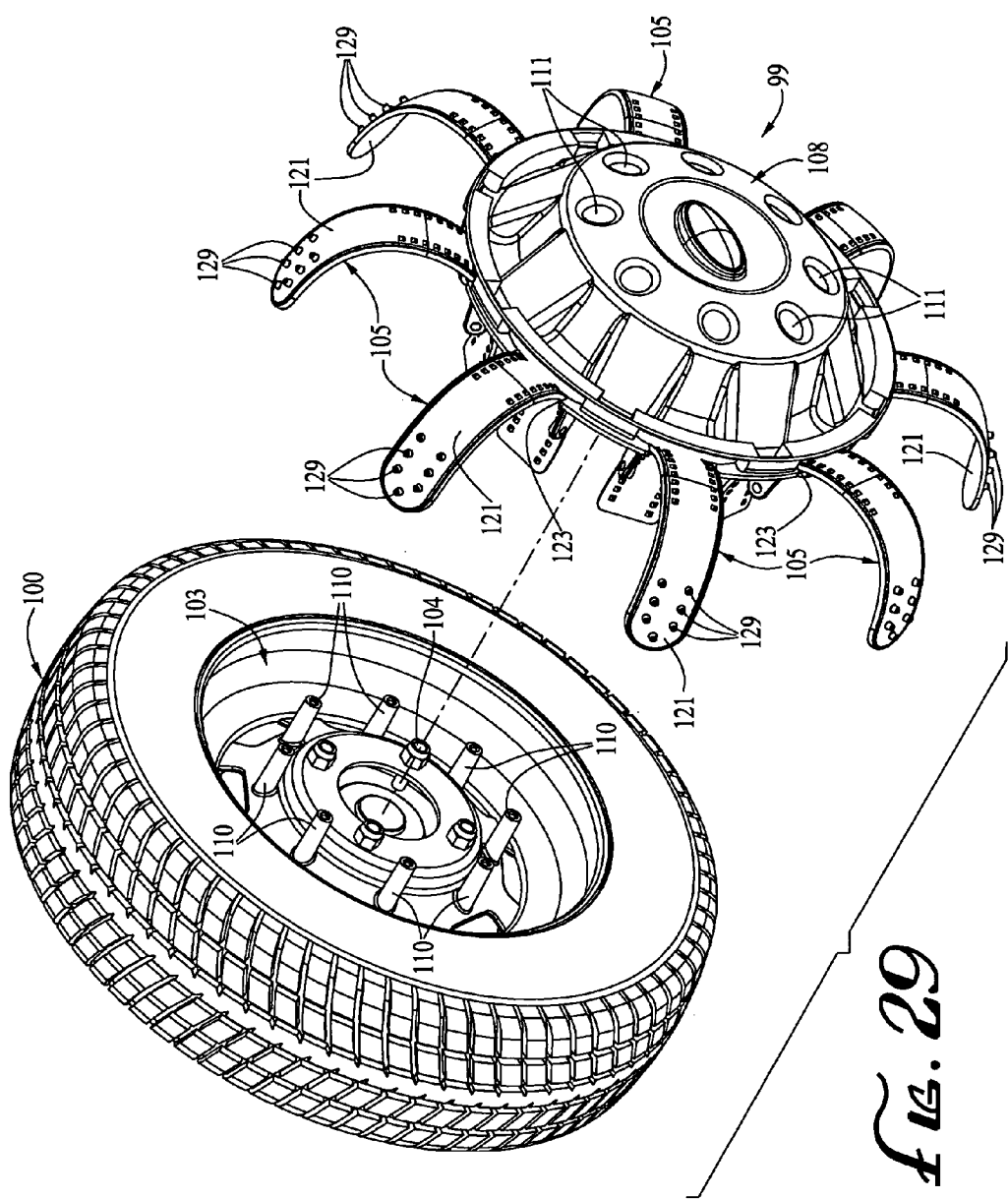

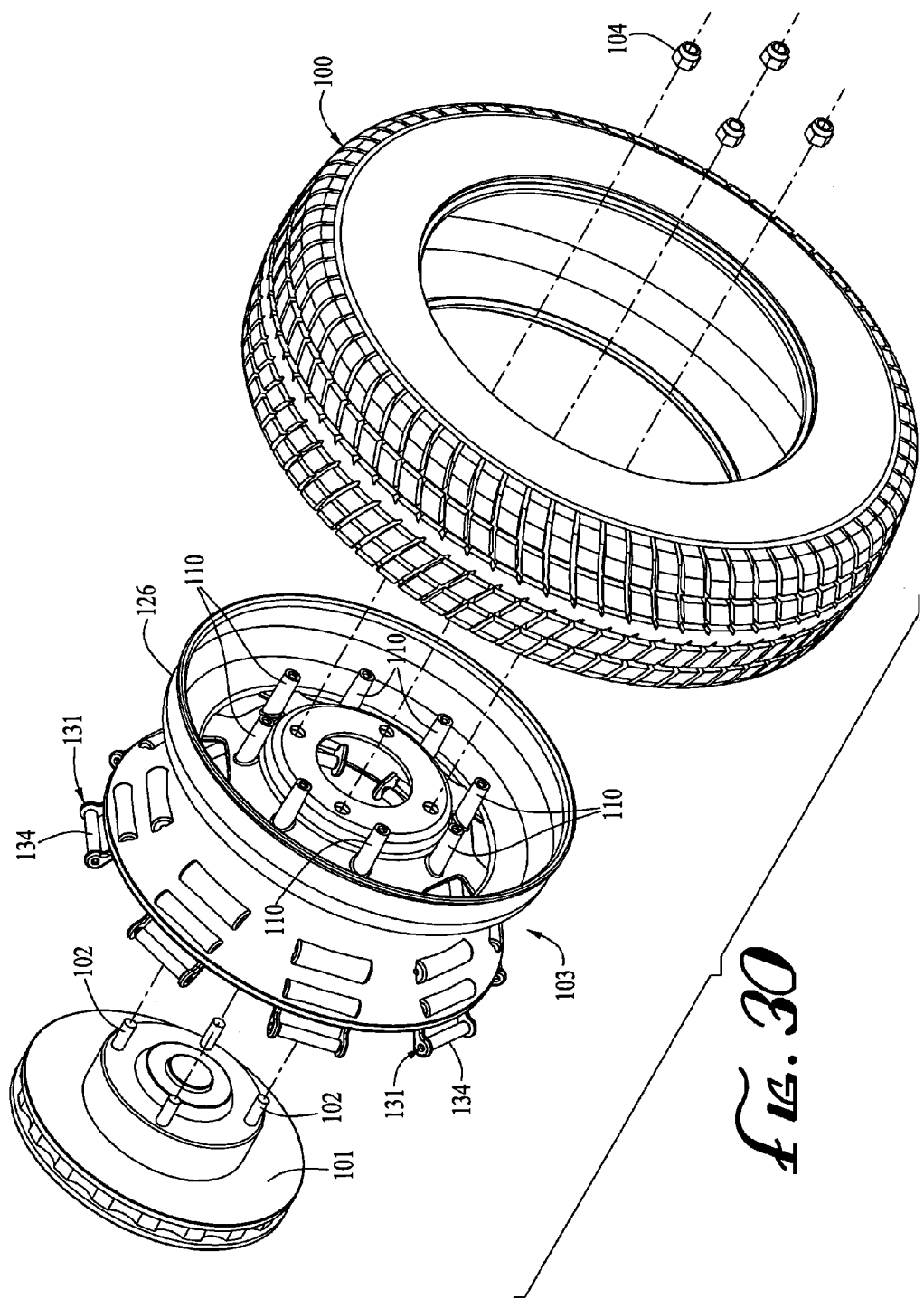

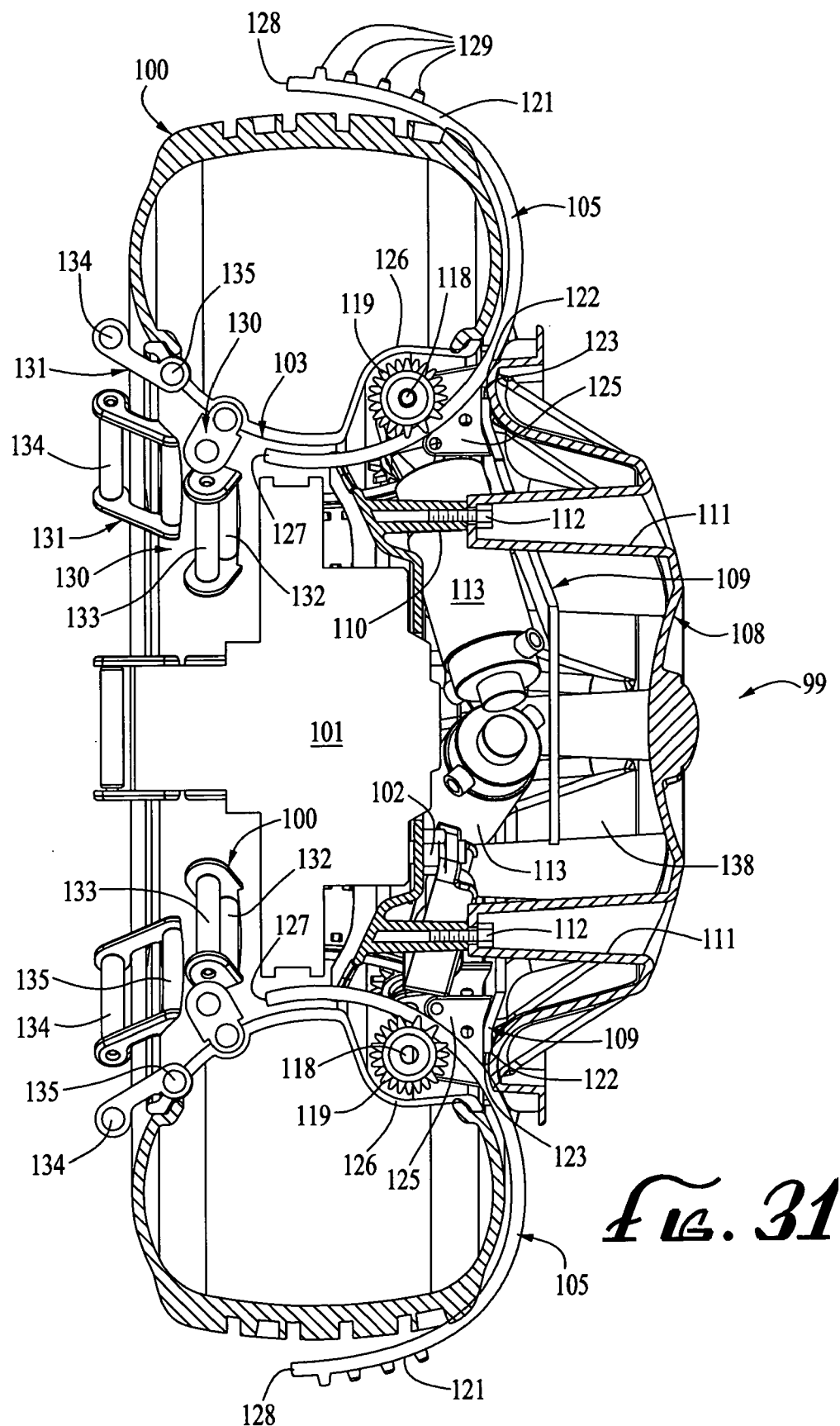

AUTOMATIC SAFETY TIRE DEVICE

BACKGROUND OF THE INVENTION

This invention relates to an automatic device for converting conventional vehicle tires into safety tires having special traction elements added to the conventional tires when increased traction is needed for snow, ice, or other slippery conditions.

It has long been known that vehicle tires with conventional tire treads designed for relatively smooth roads often do not provide adequate traction for snow, ice or other slippery conditions. Accordingly, it is customary for persons who will be driving in locations and at times where such conditions may be encountered either to equip their vehicles with so-called "snow tires" having special deep treads for better traction or to carry with them so-called "snow chains" to be mounted on the tires when the slippery conditions are encountered. Both snow tires and snow chains typically are used only on the powered wheels of the vehicle. While snow tires are usable on non-slippery surfaces and thus can be conveniently used, where legal, for the entire snow season, chains provide a higher level of traction and are more effective.

Typical snow chains comprise a series of short lengths of flexible and durable material, usually metal but sometimes plastic or the like, spaced around and extending transversely across the tread of the tire, and two mounting strips that are connected to opposite ends of the transverse strips to extend along the sidewalls of the tire and joined together at their ends to secure the chains in place around the tires. Typically, a releasable clip carried on one end of the mounting strip is releasably connected to a link on the other end to secure the chain in place Unfortunately, chains can be damaged by driving on "dry" pavement for more than brief periods, and also can damage tires and some road surfaces. Accordingly, chains cannot be left indefinitely on a vehicle during the snow season, but instead typically are carried in the vehicle and installed whenever the need arises and for as long as the need continues. A major disadvantage of such chains, however, is the time and effort required to install them on the tires, particularly when the need arises during a trip so as to require roadside installation. Moreover, such installation cannot be performed quickly or while the vehicle is in motion, so chains cannot be made immediately available in an emergency situation, such as the dangerous situation when a vehicle is driven unexpectedly onto a stretch of ice on the roadway. Every installation of conventional chains requires the user to stop the vehicle, position the chains on the respective wheels of the vehicle, and then connect the ends of the chains before resuming driving. This can be a nasty process in the cold, snowy or slushy conditions that often exist when the need for chains arises.

Efforts have been made to provide snow chains and similar devices that are more easily installed for use. For example, U.S. Pat. No. 5,501,482 discloses a traction device that can be fitted to the side of a wheel and having a number of generally radially extending traction arms formed integrally with a central disc and having free outer end portions that bend around the tire. As with conventional chains, this type of traction device must be installed manually on the wheels when snow conditions are encountered, and does not avoid the shortcomings of other prior devices. While some of these devices appear to be better than conventional snow chains, the need still exists for a safe, effective and reliable tire device that can be automatically installed on, and removed from, vehicle tires so as to be quickly and easily available when needed without the time delay and effort required for conventional snow chains and traction devices.

SUMMARY OF THE INVENTION

The present invention resides in a novel safety tire device that can be installed in an deactivated condition and out-of-the-way position on a wheel with traction elements that are withdrawn from the road-engaging surface of the tire so as to avoid interference with the smooth ride of the vehicle and to avoid wear and tear on the traction elements until a real need exists, and then can be activated and extended automatically into traction-providing positions across the wheel tread area, thereby converting from a "normal" deactivated condition to an "emergency" activated condition. Further, the safety tire device can be returned automatically to the deactivated condition when no longer needed. In addition, the nature of the invention is such that the device can be actuated automatically in response to sensed dangerous conditions of the road, and can be actuated even while the vehicle is moving, and different highly effective traction elements can be provided to suit different dangerous conditions to be encountered.

For these purposes, the automatic safety tire device of the present invention comprises a housing that is mountable on one side of a vehicle wheel, conveniently by bolting it to the wheel hub using the existing lugs of the wheel, and carrying a plurality of automatic traction assemblies that extend a plurality of traction elements radially of the wheel and the tire to the outer periphery of the tire. Each automatic assembly includes an elongated and somewhat flexible traction element that is held in a retracted position on the assembly when the safety tire device is deactivated, but is moved into an extended position, across the tread, when the device is activated. The preferred traction element of this embodiment is an elongated arm having a traction pad on its outer end, and a power actuator that is mounted on a base attached to the hub of the wheel, a plurality of the traction arms being disposed in radially outwardly extendable and retractable positions on the body and positioned by actuators that can be activated automatically to extend and retract the arms on demand. The traction pads are movable from retracted positions against the sidewall of the tire to extended positions overlying the tread portion of the tire, and the arm and pad unit of this embodiment is molded of a flexible plastic or rubber in a slightly curved shape to conform to the shape of the tire and to lie flat against the tire.

The safety tire device has a shell which covers the arms and guides them during extension and retraction, and also covers the actuators, which drive rack-and-pinion connections to the arms in the preferred embodiments. The device is mounted on the side of the wheel, and preferably includes a heater/blower to keep the parts free and operable in wintry conditions.

Alternative embodiments show different arm and traction pad configurations, different actuators, actuators with spring connections to the traction pads for enhanced cushioning action, and spring-and-roller mounting assemblies for the arms. One such embodiment has elongated, narrow traction arms with substantially wider outer end paddle-like portions or pads, wide bends of approximately ninety degrees at the outer ends of the arms and free outer end portions that are carved to follow the contour of the tire and fit snugly against the tread portion. For increased traction, the pads may have a plurality of apertures and rows of bumps for increasing friction between the pads and the roadway and also with the tire. The arms are slidably mounted and guided to hold them against pinions that mesh with slots in the arms, forming racks for the pinions, and the pinions are driven, preferably in pairs, by rotary power operators coupled by T-connections to two pinion gears carried on flexible shafts, and the central portion of the device is protected by a special outer cover. Possible variations include modifications in motors, drives, pad configurations and support of the traction arms.

In another alternative embodiment, the preferred traction element is an elongated spring coil that is movably mounted in a cylinder constituting the body of the actuator assembly with the outer end portion of the retracted coil adjacent to the outer periphery of the tire in an L-shaped nozzle that is positioned to direct the spring coil across the tire tread as it is extended from the nozzle. Thus, the spring coils form both the traction arms and the traction pads for overlying the tread portion of the tire. The cylinder also contains a linear power actuator for extending and retracting the spring coil through the nozzle, preferably a pneumatic actuator within the cylinder. The spring coil is sufficiently flexible to bend in passing out of and back into the L-shaped nozzle, but must have sufficient stiffness to serve as an effective traction element when extended. A modification of this embodiment uses Y-shaped nozzles with two openings and spring coils that extend along one side of the tire between adjacent actuator assemblies in the inactive positions, to be extended into V-shaped traction lugs lying across the tire when activated.

Yet another, and presently preferred, alternative embodiment uses elongated, narrow and somewhat flexible traction arms similar to those in the first embodiment and having a normal or relaxed arcuate curvature for generally following the curvature of the sidewall of the tire, and with these arms have free outer end portions that may be of substantially the same width as the inner portions of the arms to form the traction pads, and a plurality of bumps are provided on the outer side of each pad for enhanced traction. These curved elements are guided around the tires and special wheels for extension and retraction, generally as in the first embodiment, the inner end portions being retractable through special wheel rims. Preferred dual rack-and-pinion drives are formed by two pinions for each arm, meshing with two radial series of slots in the arm along its opposite radial edges and driven by rotary operators, one such operator preferably driving two pinions on adjacent arms through T-connectors similar to those in the first embodiment. Special guides mounted on the special wheel rims support and brace the arms in use, and special hubs cover the operating elements of the device.

Other detailed aspects of the invention will be apparent from the accompanying drawings and the detailed descriptions of the various embodiments.

BRIEF DESCRIPTION OF THE DRAWINGS

FIG. 1 is a front or outer side left perspective view of a first embodiment of an automatic safety tire device embodying the novel features of the present invention, shown installed on a representative vehicle tire, with traction arms and pads in retracted positions;

FIG. 2 is a perspective view similar to FIG. 1 showing the device with the traction arms and pads extended;

FIG. 5 is a perspective view of the automatic safety device of FIG. 2 with the outer cover removed;

FIG. 6 is a perspective view of the device of FIG. 2 apart from the tire, taken from the inner side of the device;

FIG. 7 is a perspective view of the tire of FIG. 1 with only the base of the safety device attached;

FIG. 8 is a view similar to FIG. 6 with the base attached to the device;

FIG. 11 is a perspective view similar to FIG. 4;

FIG. 12 is an enlarged perspective view of a representative remote control for the safety device;

FIGS. 13, 14 and 15 are perspective views of a modified form of the first alternative embodiment of the invention having handhold holes in the arms for manual assistance, if needed;

FIGS. 16 and 17 are side elevational views of opposite sides of a further modified form of the first embodiment, also having handhold holes and differently shaped traction pads;

FIG. 26 is a view similar to FIG. 23 showing an alternative form of this embodiment with traction elements in the inactive, retracted condition;

FIG. 27 is a view of the embodiment in FIG. 26 with the traction elements in the active, extended positions with the spring coils forming V-shaped traction lugs;

FIG. 28 is a right perspective view of a third, presently preferred alternative embodiment of the present invention, shown installed on a representative vehicle tire that is mounted on a special wheel with the traction elements in extended positions;

FIG. 29 is an exploded perspective view of the embodiment in FIG. 28, showing the traction elements separated from the special wheel and the tire;

FIG. 30 is an exploded perspective view of the special wheel and tire of FIG. 29;

FIG. 31 is an enlarged cross-sectional view taken along line 31—31 of FIG. 28;

DETAILED DESCRIPTION OF THE FIRST EMBODIMENT

Figure 3:
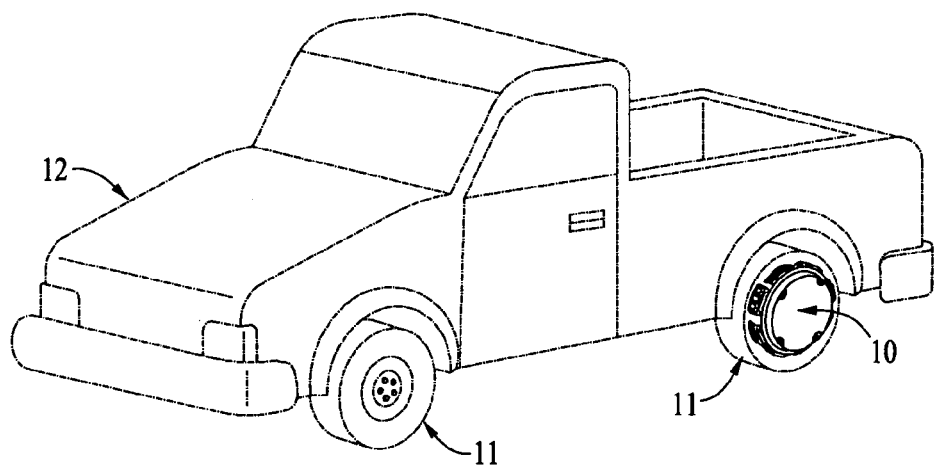
FIG. 3 is a broken-line side perspective view of a representative vehicle, specifically a pick-up truck, shown with the safety tire device of the present invention installed on a rear tire, in the manner shown in larger scale in FIG. 1.
Figure 4:
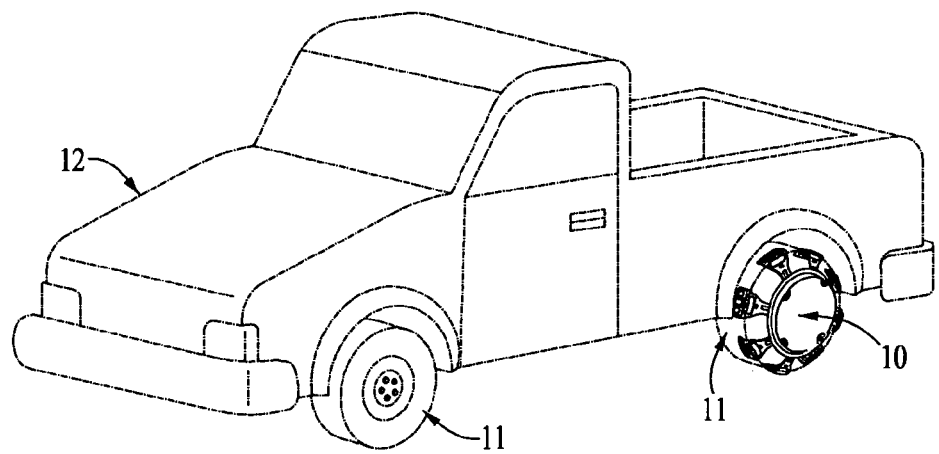
FIG. 4 is a view similar to FIG. 3 with the traction arms and pads of the safety tire device in extended positions.

As shown in the drawings for purposes of illustration, the invention is embodied in an automatic safety tire device, indicated generally by the reference number 10 in FIGS. 1 through 10, that is mountable on the wheel 11 of a vehicle 12 such as a pick-up truck as shown in FIGS. 3 and 4, and including a plurality of automatically extendable and retractable traction arms, indicated generally by the number 13, for increasing the traction of the wheel under slippery conditions such as those encountered with snow or ice. The device 10 is shown on one rear, powered wheel of the vehicle in FIGS. 3 and 4, it being understood that a similar device (not shown) is to be provided on the other rear wheel. Increased traction will not be needed on the front wheels, unless the truck is a front-wheel drive vehicle. While the illustrative vehicle is a pick-up truck, it is to be understood that the invention may be used on any type of vehicle in which increased traction may be needed for safety or more effective operation.

The safety tire device of the present invention comprises generally a base 14 (FIGS. 9 and 10) made up of a hub cup 15 that attaches to the lugs of the vehicle wheel, a sleeve 17 that slides over the cup and mounts thereon with a series of slots 18 that permit axial movement, and a side ring 19 carried on the sleeve by an annular series of springs 20, to be pressed yieldably against the sidewall of the tire. The full series of springs is shown in FIG. 8, and the position of the side ring 19 on the tire is shown in FIG. 7. The device also has a disk-like body 21 that supports a plurality of traction arms 22 and pads 23 for movement between retracted positions (FIGS. 1 and 3) and extended positions (FIGS. 2, 4 and 5), and actuator assemblies 24 for effecting such movement; and a outer cover shell 25 that attaches to the body to enclose the inner working parts of the device. Inside the cover are a heater/blower unit 27 (FIG. 6) for circulating hot air inside the device, and a battery (not shown) for supplying electricity to the parts.

It will be seen in the drawings that the traction arms 22 and pads 23 are formed as integral parts, preferably molded of firm but flexible plastic or rubber, or a mixture of metal, rubber or plastic, the arms being elongated narrow strips and the pads being outer end paddle-like portions having wide bends 28 of approximately 90 degrees at the outer ends of the arms and free outer end portions that are curved to follow the contour of the tire and snugly against the tread portion of the tire.

For increased traction, each pad has three oval apertures 29 and four rows of bumps 30 on its radially outer surface, and also on its inner surface, to increase friction or traction between the pad and the tire.

Figure 9:
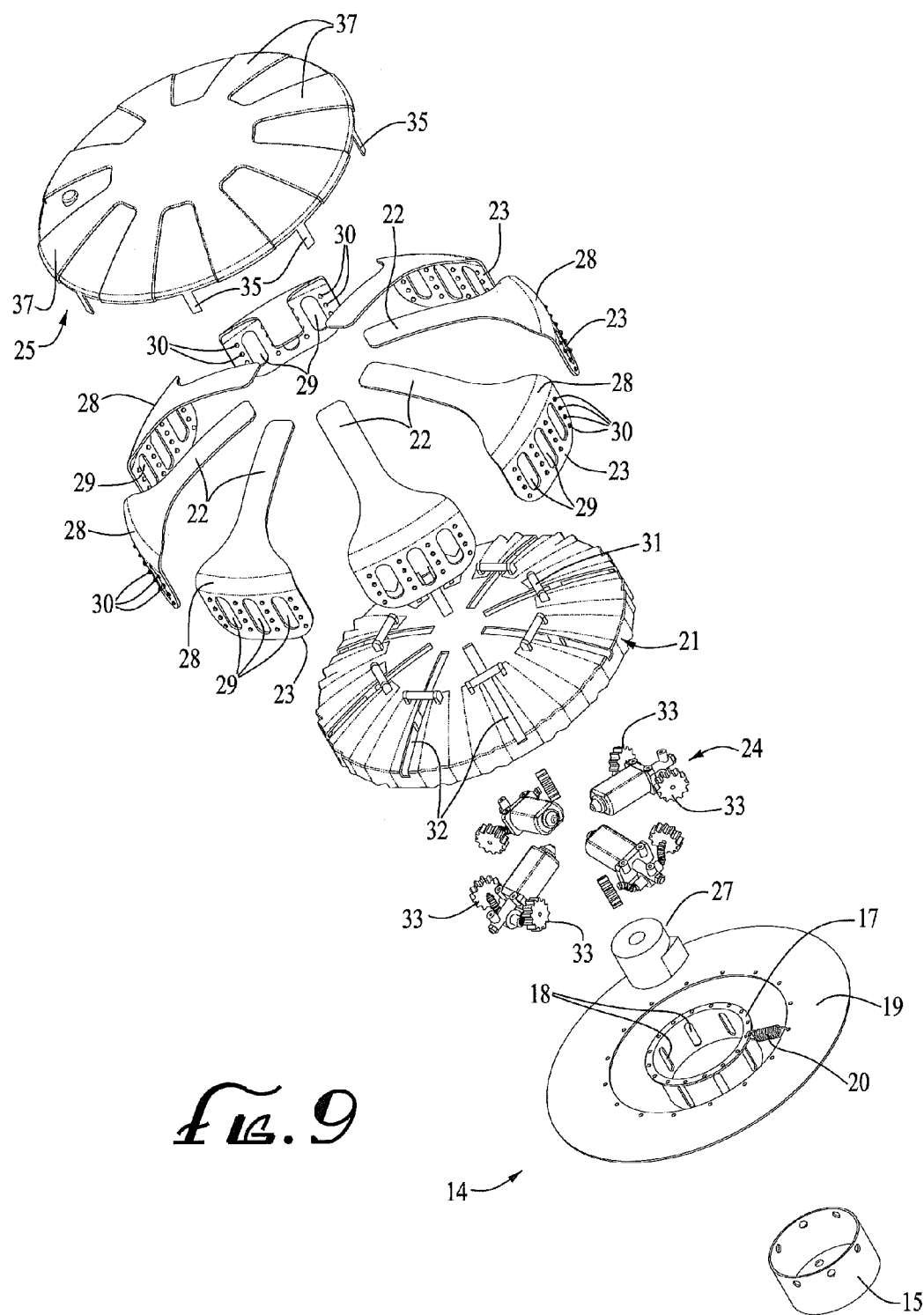
FIG. 9 is an exploded perspective view of the entire safety device, apart from the wheel and tire shown in FIGS. 1 and 2.
Figure 10:
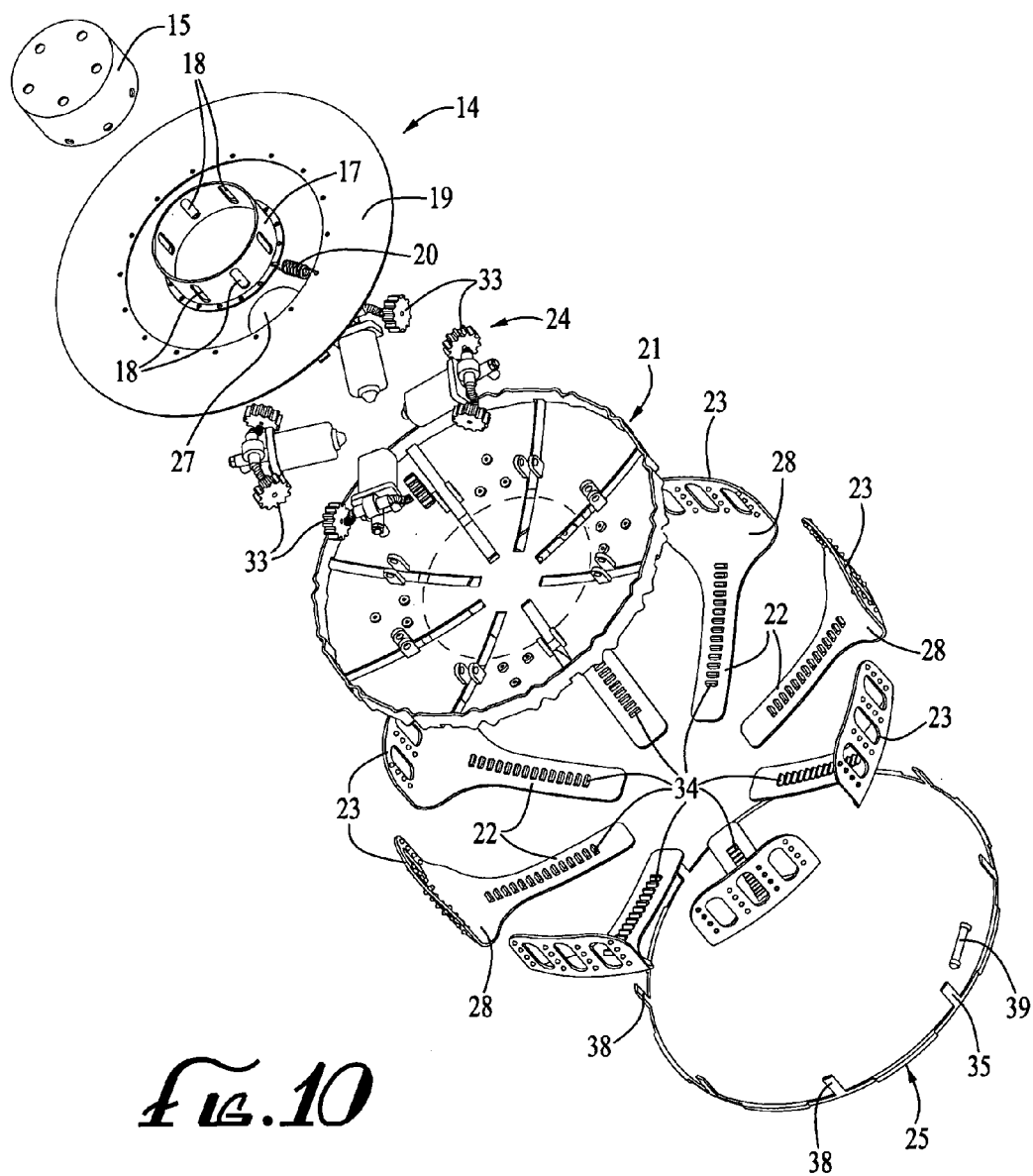
FIG. 10 is an exploded perspective view similar to FIG. 9 but taken from the other side.

As shown most clearly in FIG. 5, the traction arms 22 are slidably mounted on the outer side of the body 21 by small U-shaped brackets 31 that straddle the arms and hold them flat against the body, over slots 32 (FIG. 6) that are generally centered on the inner sides of the arms. As shown in FIGS. 9 and 10, the arms are curved to conform to the curvature of the body when free, and the bent portions 28 and pads 23 are shaped to curve from the side of the tire onto the tread portion in the extended position (FIG. 2). When retracted, however, the pads are bent to shallower angles with the arms and conform to the contour of the sidewall of the tire, lying substantially flat against the sidewall.

The actuating mechanisms for extending and retracting the arms 22 and the pads 23 are shown most clearly in FIG. 6. These comprise four power operators 24, each disposed between two of the slots and having an output shaft coupled by a T-connection to two pinion gears 33 mounted on flexible shafts and overlying the slots 32 on both sides of the operator. Through the slots, the teeth of the pinions mesh with rack teeth 34 on the inner sides of the arms 22 so that turning of the pinions moves the arms accordingly.

At their outer ends, the arms 22 are held slidably against the body 21 by the cover shell 25, which fits over the body 21 and forms outwardly opening slots through which the arms and pads can move radially outwardly and inwardly, in channels 37 molded in the cover. The cover shell is positioned by tabs 35 that extend inwardly between the paddles, and is connected securely to the body by bolts 38 (FIG. 1) that are threaded into the body at their inner ends. Rollers 39 (one being shown in FIG. 10) can be provided to engage and guide the arms. While one kind of traction pads has been shown, it will be apparent that various kinds of pads can be used, and can be changed to suit the particular road conditions expected to be encountered.

DESCRIPTION OF MODIFIED FORMS OF THE FIRST EMBODIMENT

Shown in FIGS. 11 through 21 are alternative modified forms of the first embodiment of the invention, that operate on the same principles as the first form of this embodiment and incorporate several specific differences that maybe used in the device of the present invention. FIG. 11 is a repeat of FIG. 4 showing a pick-up truck 12 with minor differences, and FIG. 12 is an enlarged perspective view of an on-off control box 40 having control buttons 41 and 42, and panels 43 and 44 having sequential indicator lights for showing operation of the safety device and mounting arms 45. FIGS. 13 and 15 show a modified form of the arm-and-traction pads in which hand-grip openings 47 are formed in the pads 23, facilitating manual assistance if hampered by snow or ice; in fact, manual actuation is possible, as an alternative to automatic actuation.

FIGS. 15, 16 and 17 show an alternative approach to actuation of the arms, using rotary motors 48 driving pinions 49 that engage with the racks 50 on the arms, the motors and pinions forming actuating assemblies that are mounted on rods 51 that extend radially outwardly from the central hub 52 and are urged by yieldable springs 53, arranged in an annular series around the hub, toward centered positions. This permits the actuating assemblies to swing to some extent during actuation. An electronic control panel 54 is mounted in the hub.

Figure 18:
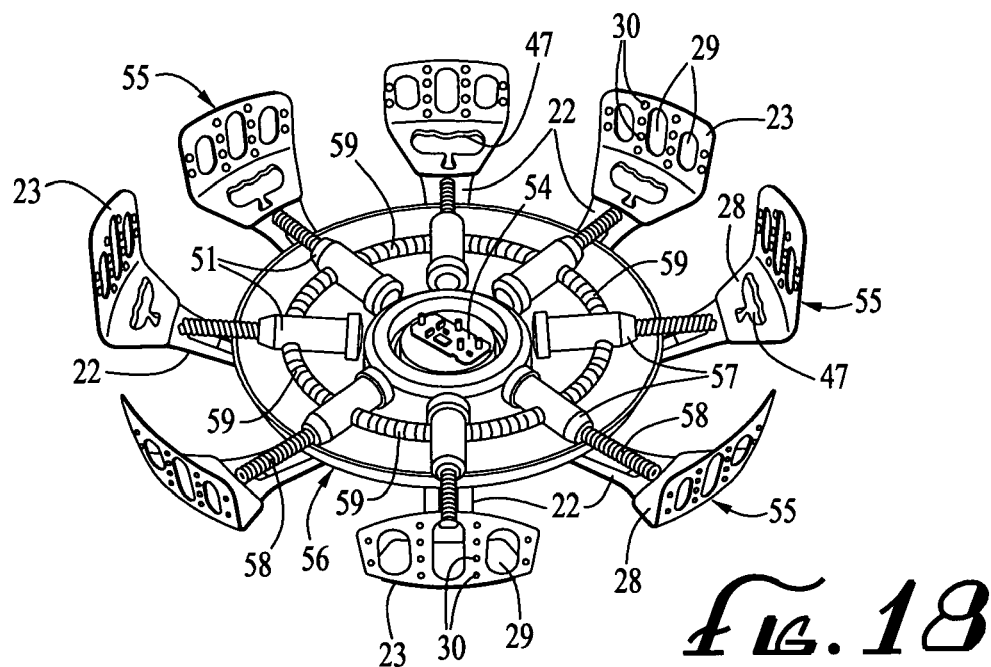
FIGS. 18 and 19 are views of a third modified form of the first embodiment having different actuators.
Figure 19:
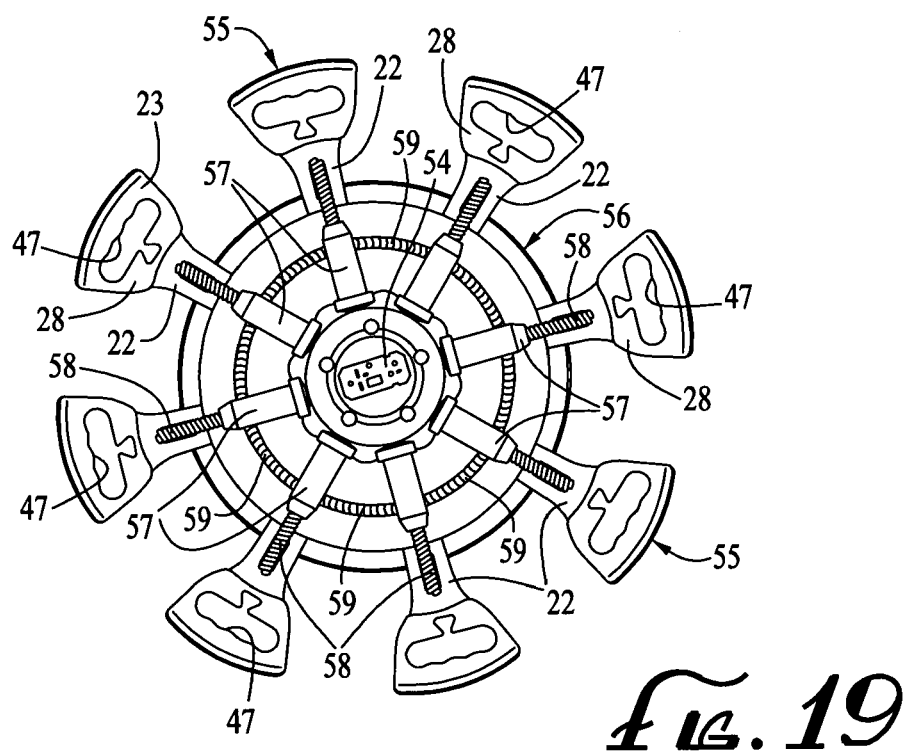

In FIGS. 18 and 19, the arm and pad assemblies 55 are slidably mounted on a body 56, as before, but the actuators are radial cylinders 57 having elongated spring coils 58 that are extended and retracted by the cylinders, the outer ends of the coils being attached to the arms 22 at their outer ends, near the bends 28 in which handholes 47 are formed. The coils are extended and retracted by the actuators to activate and deactivate the safety device, as in the other forms of this embodiment. An annular series of springs 59 between the cylinders holds them yieldably in their normal radial positions, and the control panel 54 again is mounted in the hub.

Figure 20:
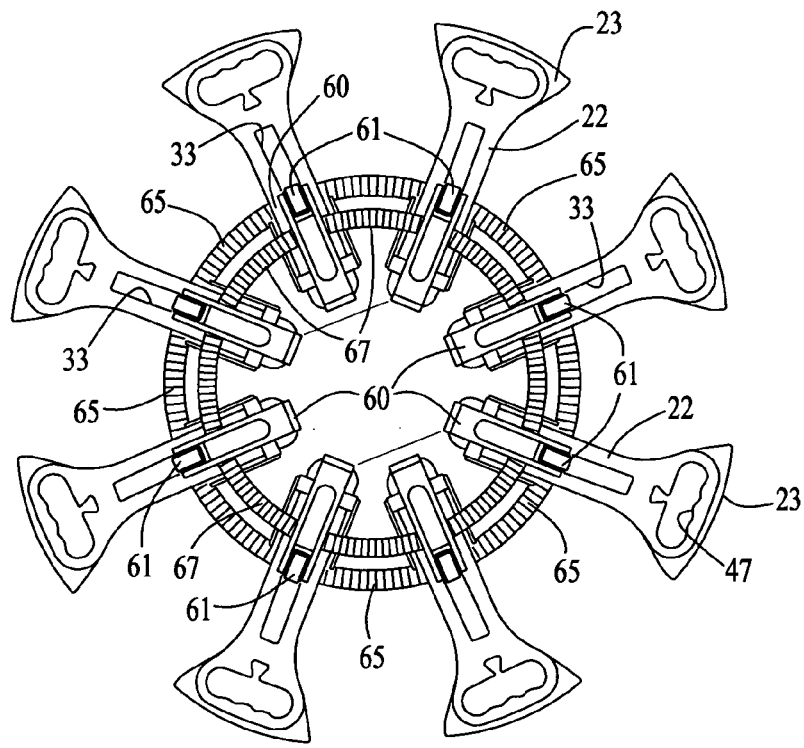
FIGS. 20 and 21 are views of a fourth modified form of the first embodiment with a different configuration of arms and pads, springs for positioning the arms, and roller guides for holding the arms against the tire.
Figure 21:
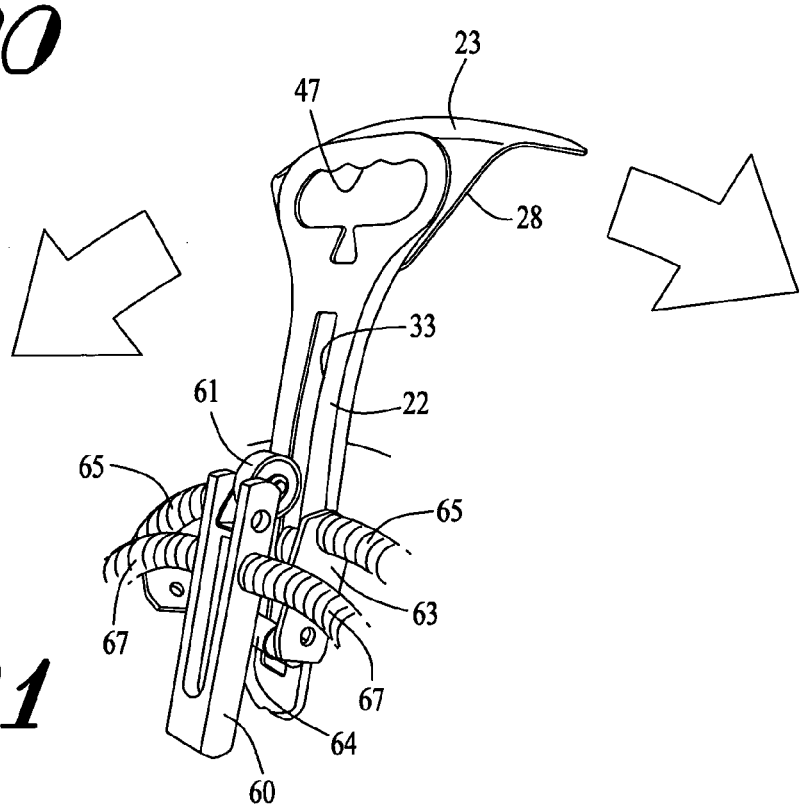

In FIGS. 20 and 21, an alternative form of the supports for the arm and pad elements is shown. A bracket 60 overlies each of the arms 22 with a roller 61 pressed toward the outer side of the arm and into the slot 33 therein, and each arm 22 is guided in a second bracket 63, as shown in FIG. 21, with a roller guide 64 overlying the arm. One annular set of coiled springs 65 holds the guide brackets 63 for the arms yieldably in their centered positions and a second annular set of coiled springs 67 holds the roller guides 61 yieldably over the arms. In other respects, the arm and pad elements are the same as the previous form.

It will be seen that this embodiment of the invention provides a novel safety tire device for providing emergency traction pads on the tread portions of the tires of a vehicle, automatically upon demand. The arm and pad elements of the invention normally are carried in retracted, deactivated positions on the side of the tire, and can be activated and powered into extended positions by the actuators that are carried in the device, supplied with electricity by a suitable battery contained in the device and controlled by the operator of the vehicle. It should be noted that the device of the present invention can be activated while the vehicle is in motion, by a suitable control (not shown) which times the extension of the arms to extend them when they are spaced from the ground, and with yieldable mounting arrangements which permit the flexible arms 22 and the actuators to yield when an obstruction is encountered. An automatic control can be provided to activate the device automatically in response to the encountering of dangerous conditions—for example, if the traction of the vehicle falls below a minimum level, as sensed. It also is to be noted that this invention can be applied to the wheels of any kind of vehicle for improved traction, and is not limited to automobiles or trucks. For example, it can be installed on the tires of airplanes for enhanced braking action.

DETAILED DESCRIPTION OF THE SECOND EMBODIMENT

As shown in FIGS. 22–27 of the drawings, the second embodiment of the invention is an automatic safety tire device indicated generally by the reference number 10', The reference numbers of this embodiment are primed to distinguish them from the numbers of the first embodiment. There is no correlation of these numbers. The device 10' has traction coils 11' (FIGS. 24 and 25) that can be extended and retracted automatically by linear actuator assemblies 12' (six being shown) that extend radially outwardly from a central hub or body 13' that fits over and can be bolted to the hub of the wheel that carries a tire 14' (shown in broken lines). It can be seen that the hub 13' of the device 10' has holes 15' that can be aligned with the lug holes of the wheel of a vehicle, and thus can be attached to the wheel in this manner.

Figure 22:
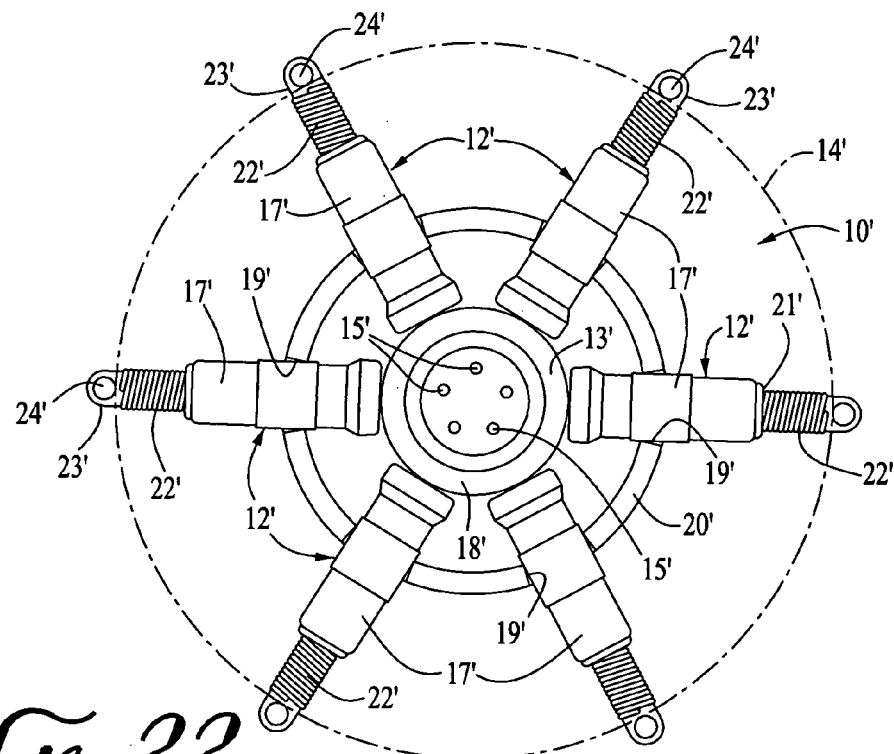
FIG. 22 is a front or outer side elevational view of a second alternative embodiment of the present invention, with the outline of a tire on which the device is installed shown in broken lines and with traction elements in the form of spring coils shown retracted.
Figure 23:
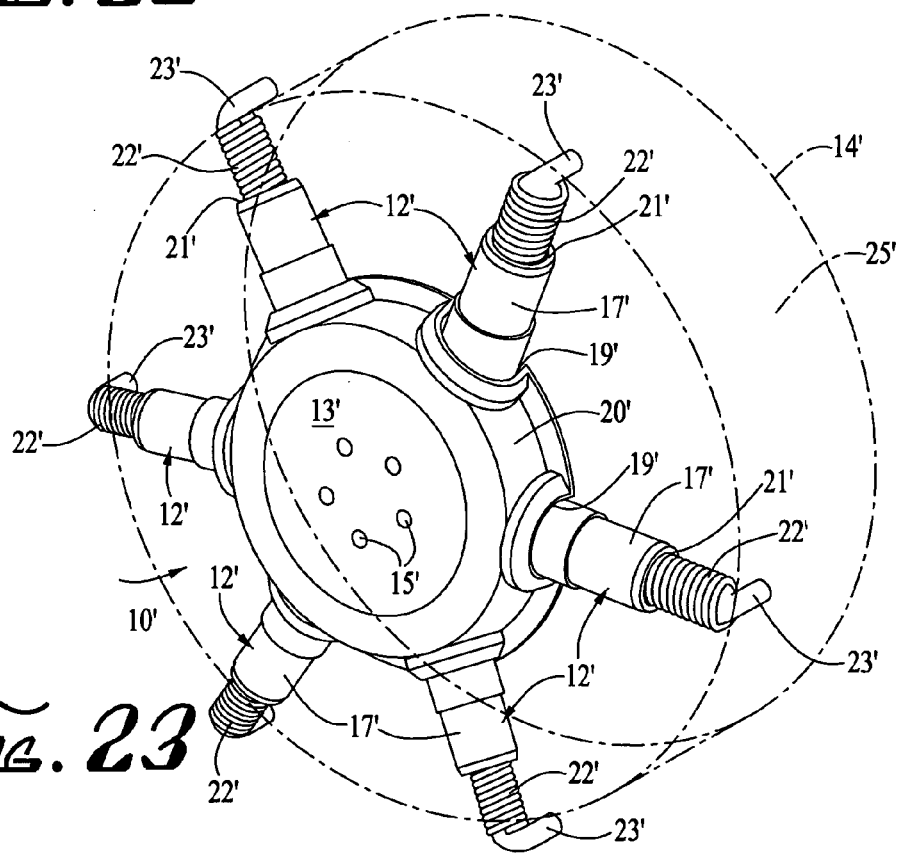
FIG. 23 is a front perspective view of the safety tire device shown in FIG. 22.

As shown most clearly in FIGS. 22 and 23, the actuator assemblies 12' comprise actuating cylinders 17' that are attached at their inner ends to the annular central portion 18' of the hub 13' and extend outwardly through openings 19' in the rim 20' of the hub. These may be pneumatic or hydraulic cylinders, or electromagnetic solenoids, or electric motors with screw mechanisms that produce linear output. The outer ends 21' of the cylinders 17' are positioned inwardly from the position of the outer periphery of the tire 14', as shown in FIG. 22, and carry hollow coiled extensions 22' that extend almost to the periphery of the tire. Fitted in the ends these extensions are L-shaped nozzles 23' that are bent about 90 degrees from the coil extensions and have open ends 24' (FIG. 22) that point across the tread sides 25' (FIGS. 23, 24 and 25) of the tire in the inactive position shown in FIG. 23.

Figure 24:
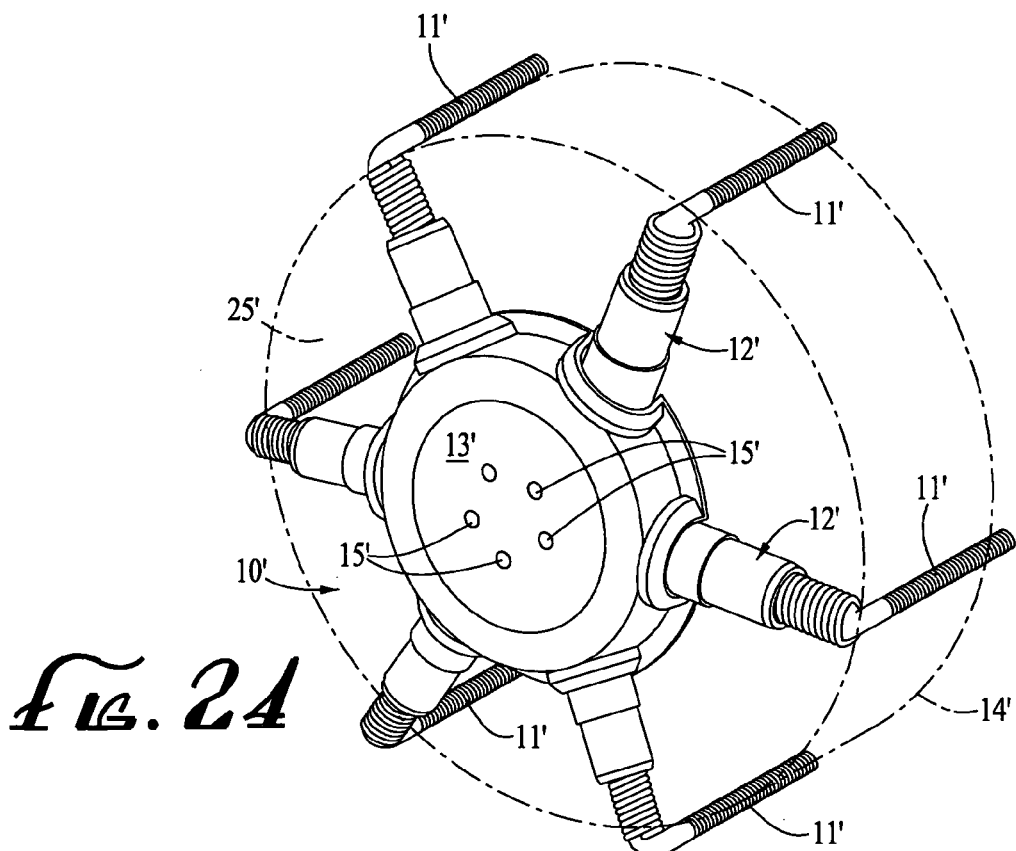
FIG. 24 is a front perspective view similar to FIG. 23 with the traction coils extended.
Figure 25:
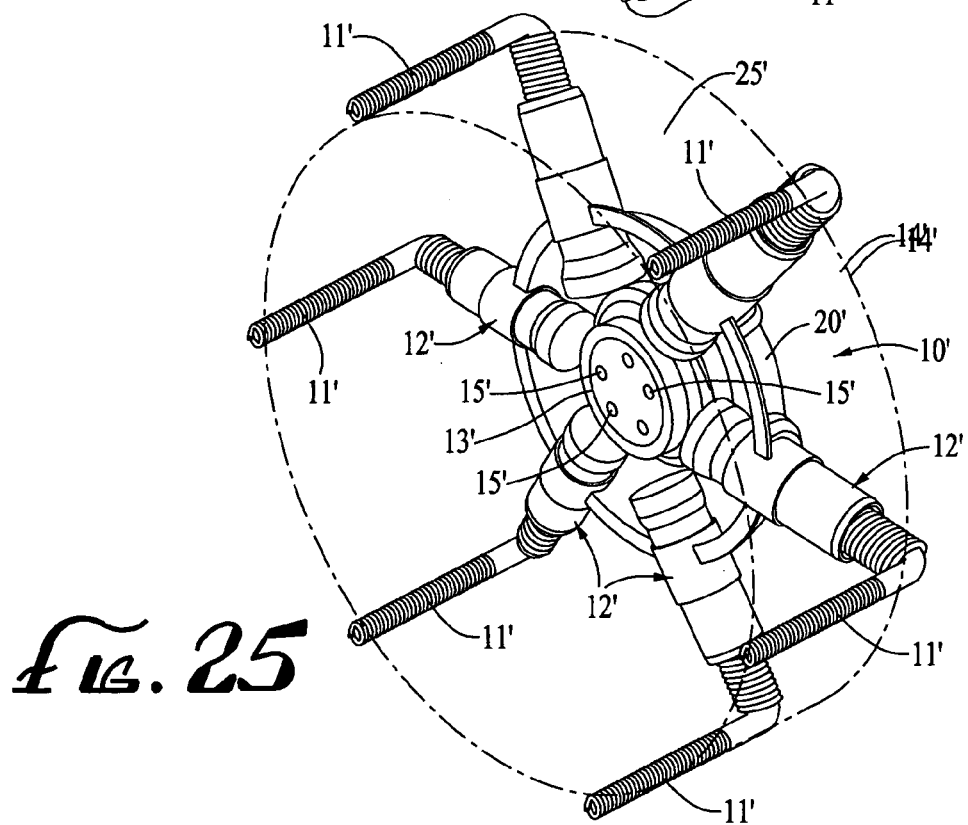
FIG. 25 is a perspective view of the safety tire device of FIG. 24 taken from the rear or inner side of the device in FIG. 24, also showing the traction coils extended.

When the safety tire device 10' is activated, the traction coils 11' are extended by the actuator assemblies 12' into the positions shown in FIGS. 24 and 25 to lie across the tread surface of the tire, as shown. The traction coils are long enough to reach substantially across the tread surface. It is to be understood that the traction coils 11' extend through the coiled extensions 22' and into the cylinders 17', to be moved endwise out and back in by the cylinders when they are actuated to activate and deactivate the traction coils. The coils are flexible enough to bend around the ninety-degree bends in the nozzles 23' and move out and back in through the open ends 24' in moving into and out of the extended, active positions shown in FIGS. 24 and 25. At the same time, they are stiff enough to be held in the active positions as the tire turns, thereby to provide the additional traction that is needed for safety purposes as the vehicle is driven on the slippery surface.

Contained in the central portion 18' of the hub 13' is a control device (not shown) that can be turned "on" and "off" to activate and deactivate the cylinders when the traction coils are needed. This device preferably is electrically controlled by the operator (driver) of the vehicle, and also can be equipped with a motion-sensitive automatic control (not shown) for activating the device in response to sliding of the vehicle or loss of traction of the wheel.

In addition, it is to be noted that these traction coils cannot be forced beneath the tire while it is in engagement with the ground. Using pneumatic cylinders as actuators provides sufficient yieldability to apply extending pressure to the traction coils that can yield and delay if they encounter resistance from the ground. Another control alternative is to provide position-sensitive switches (not shown) in the control in the central hub, such as mercury switches, which disable the actuator cylinder that controls the extension of each traction coil while it is aligned with the ground, thereby delaying the extension momentarily during turning of the wheel and avoiding application of excess forces on the traction coils.

Shown in FIGS. 26 and 27 is a modification of this embodiment 10" in which corresponding parts that may be identical are indicated by the same reference numbers as in the first form of the second embodiment, and similar parts are indicated by corresponding double-primed reference numbers. The differences in this form reside in the nozzles 23" on coiled extensions 22" of the actuator assemblies 12" which are Y-shaped and have two open ends 24" that serve as outlets and guides for traction coils 11". These coils extend across the side of the tire 14" between two nozzles in their inactive, retracted condition (FIG. 26) generally along a "chord" of the circle of the periphery of the tire. When the traction coils are extended from both ends of the chord, they bend into V-shaped active positions as shown in FIG. 27. The other aspects of this form of the second embodiment may be the same as in the first form of the second embodiment.

DETAILED DESCRIPTION OF THE THIRD EMBODIMENT

The third, and presently preferred, alternative embodiment of the invention is shown in FIGS. 28 to 34 of the drawings and comprises a traction device indicated generally by the reference number 99 for a vehicle wheel and tire 100 that is mounted on a standard wheel but 101 (FIGS. 30–32) having conventional lugs 102. The traction device is mounted on a special wheel rim 103 that is secured to the hub by lug nuts 104 and comprises generally a plurality of arcuate traction elements 105 that are carried on a drive assembly 107 (see FIG. 34) that is mounted in a cover 108 on a ring-shaped base plate 109, the entire device being held on the special rim 103 on special rim lugs 110 (FIGS. 29 and 30). These lugs, of which eight are shown in this embodiment, extend axially outwardly through the traction device 100 and abut against the inner ends of aligned tubular fastener recesses 111 that are molded in the cover 108, and receive bolts 112 (FIG. 31) that are threaded onto the rim lugs and seated against the ends of the fastener recesses. In this way, the traction device 100 is mounted securely on the standard wheel hub 101.

The drive assembly 107 is mounted on the inner side of the base plate 109 and herein comprises four rotary drive motors 113 that are supported in radially outwardly extending positions with output shafts 114 (FIG. 34) on their outer ends engaged in "T" drive couplings 115. Each of these couplings receives a drive shaft 114 in an opening 117 and has two output shafts 118 that carry spool-shaped double pinion gears 119, as shown most clearly in FIG. 34. Each of these gears has gear teeth at both ends positioned to mesh with two series of slots 120 formed in each traction element 105 along its opposite longitudinal edges, extending radially of the vehicle wheel 100. Thus, each of the drive motors 113 drives two of the pinion gears 119, and each of the pinion gears meshes with two rows of slots 120 in one of the traction elements 105 5o form a rack-and-pinion drive connection for extending and retracting that traction element.

Figure 32:
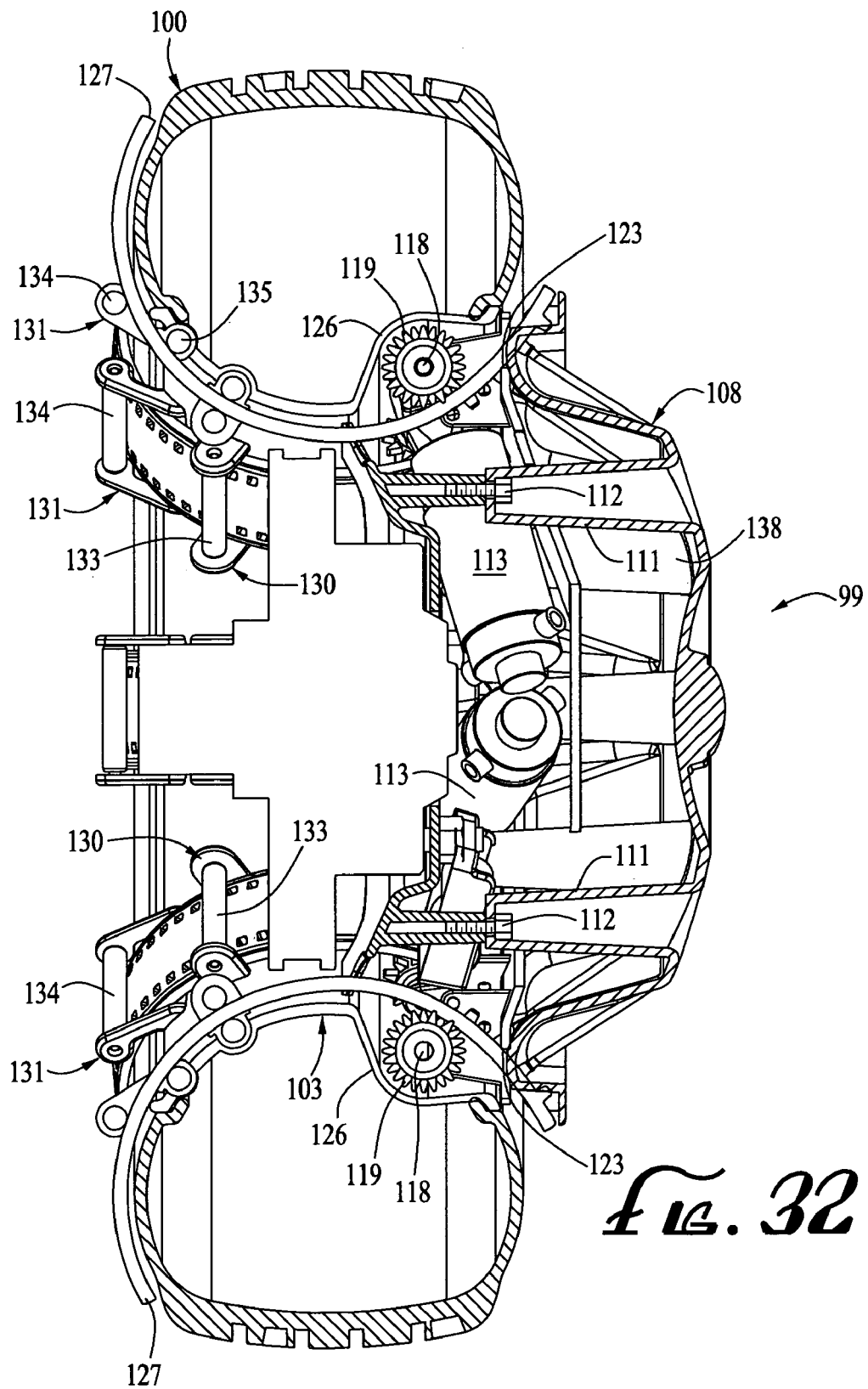
FIG. 32 is a cross-sectional view similar to FIG. 31 showing the traction elements in retracted positions.
Figure 33:
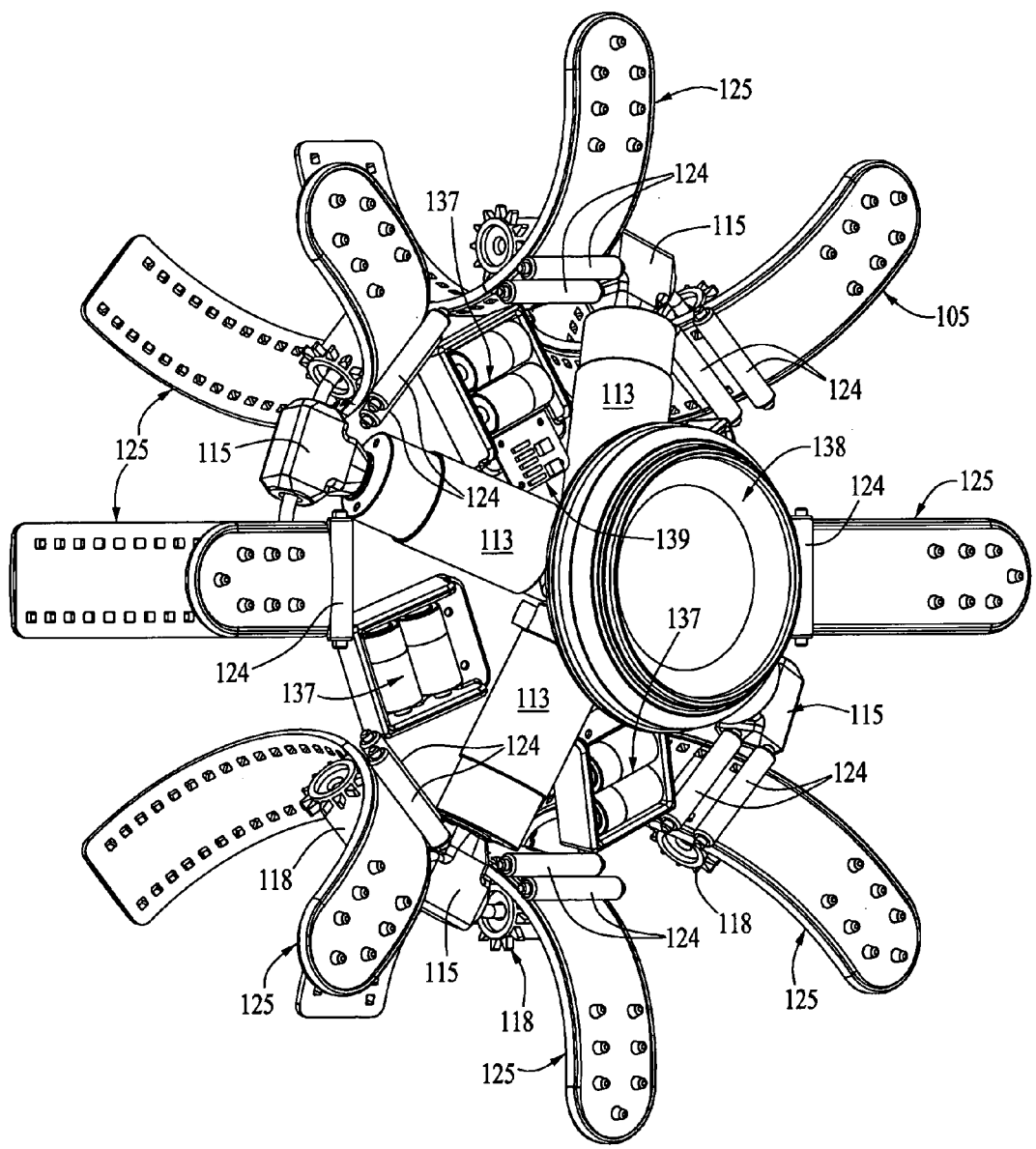
FIG. 33 is an isolated perspective view of the traction assembly alone, viewed from the opposite or inner side, from the left side in FIG. 28.
Figure 34:
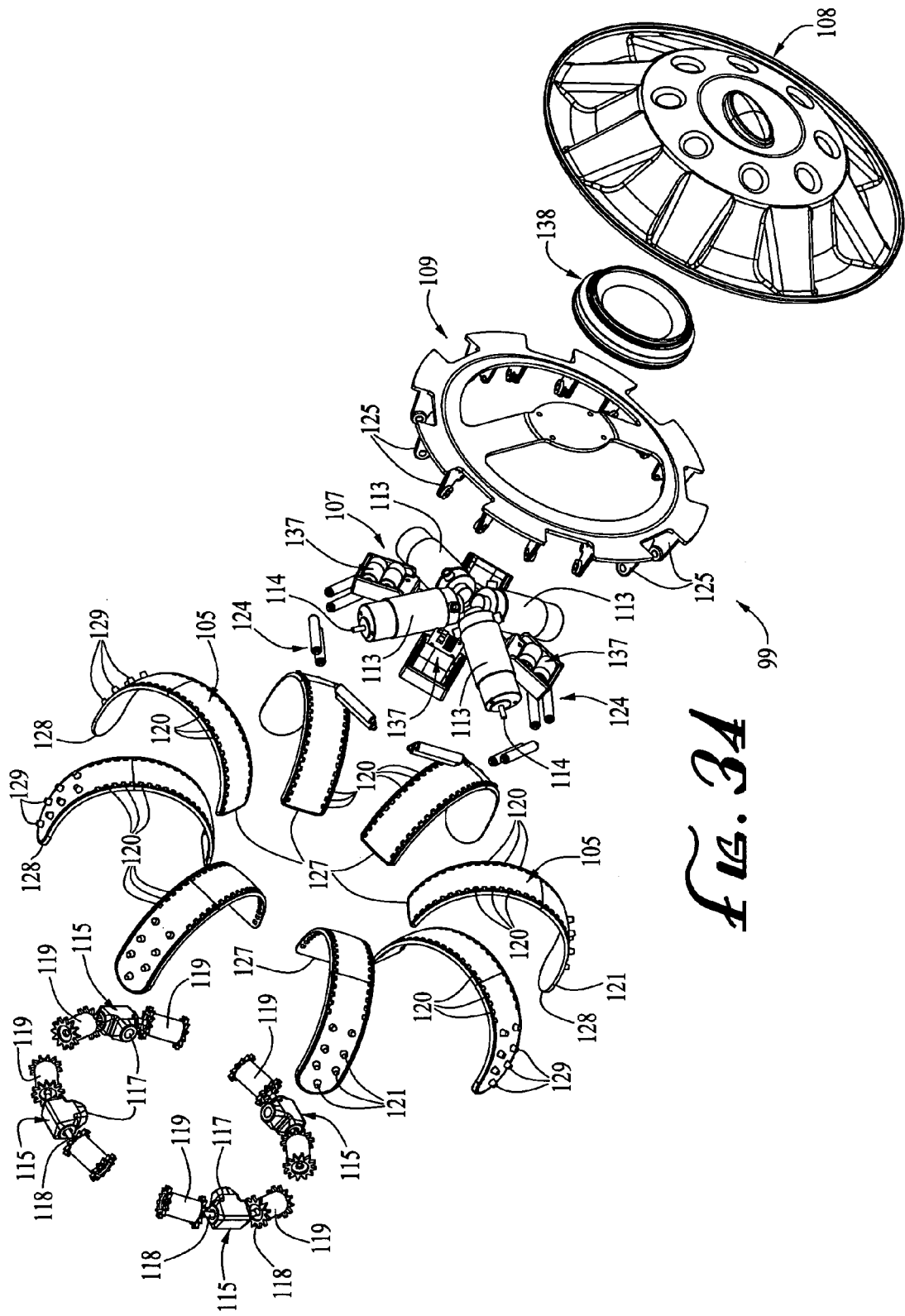
FIG. 34 is an exploded perspective view showing all of the elements of the traction assembly.

The supporting and guiding of the traction elements 105 can be seen most clearly in FIGS. 31 and 32, FIG. 31 showing the extended condition of the elements in which the outer end portions 121 of the elements overlie the treads of the vehicle tire. The arcuate curvature of the element generally follows the curvature of the sidewall of the tire and extends past the pinions 119 and into the center hole of the special rim 103. Each traction element slides along an indentation 122 in the cover 108 and passes through a notch 123 in the periphery of the ring-shaped body 109, and is guided into engagement with a pinion gear 119 by a pair of guide rollers 124 (see FIG. 33) that are supported on brackets 125 on the body 109. These rollers ensure that the traction elements will follow the curvature of the tire while also ensuring that the slots in the elements remain in driving engagement with the pinions, which maybe mounted in a groove 126 in the special rims, as shown in FIGS. 31 and 32.

It can be seen in these figures that the inner ends 127 of the extended traction elements 105 lie within the special rim and the outer ends 128 overlie the tread portion of the tire. The extended position can be varied by varying the length of the element, and herein is shown with the outer ends 128 beyond the mid-point of the tread. Traction lugs or pins 129 are preferably formed on the outer sides of the end portions of the elements forming the traction pads, the elements being of substantially uniform width along their lengths in this embodiment. Of course, other configurations can be used for the traction pads, if desired.

To guide the inner end portions of the traction elements 105 for movement into the retracted positions, shown in FIG. 32, two pairs of roller guides 130 and 131 that are mounted on the special rim 103 as shown most clearly in FIGS. 31 and 32. A first pair of roller guides 130 is secured to the rim in alignment with the inner end 127 of each traction element and defines a slot between two rollers 132 and 133 for receiving the traction element as it is retracted. A second pair of roller guides 131 is secured to the rim beyond the first pair 130 and defines a second slot between two rollers 134 and 135 for receiving the inner end 127 of the traction element as it approaches the retracted position (FIG. 5), hereafter guiding and holding the element as shown. This arrangement of guides holds the elements securely in place during high-speed operation of the vehicle while the elements are retracted.

Power for the actuators 113 is provided by battery packs 137 (FIG. 34) which are positioned between the actuators, which herein are D.C. motors. The battery packs are connected to a generator 138 that is mounted within the cover and operable in response to rotary motion of the wheel to maintain the charges on the battery packs. A control panel 139 (FIG. 33) in the form of a circuit board also is provided in the assembly under the cover.

The invention claimed is:

1. A safety tire device mountable on a vehicle wheel having a tire thereon with a tread portion for engaging a supporting surface, said device having, in combination:
   a body mountable on a side of the wheel;
   a plurality of generally radially extending traction arms mounted on said body for radial movement between retracted positions and extended positions, said traction arms having free outer end portions forming traction elements for overlying the tread portion of the tire in said extended positions and lying alongside the tire in said retracted positions, and inner end portions joined said outer end portions by resilient bends;
   and a plurality of separate power actuators mounted on said body and drivingly connected to said traction arms to move the arms between said retracted and extended positions.

2. A safety tire device as defined in claim 1 wherein said traction arms are elongated plastic arms and said traction elements are integrally formed as the outer end portions of said arms whereby said bends hold said traction elements yieldably over the tread portions in said extended positions and permit straightening of the arms when retracted.

3. A safety tire device as defined in claim 2 wherein said traction arms are generally L-shaped when free, the traction elements being joined to the traction arms by ninety-degree bends.

4. A safety tire device as defined in claim 2 wherein said traction arms are arcuately curved.

5. A safety tire device as defined in claim 4 wherein said traction elements are the outer end portions of traction arms that are substantially uniform width along their entire lengths.

6. A safety tire device as defined in claim 4 wherein said traction elements are enlarged flat pads on the outer ends of the traction arms.

7. A safety tire device as defined in claim 1 wherein said power actuators are connected to said arms by rack-and-pinion drive couplings for extending and retracting the traction arms.

8. A safety tire device as defined in claim 7 wherein said actuators drive pinion gears that engage racks formed in said traction arms.

9. A safety tire device as defined in claim 7 wherein each of said actuators drives two pinion gears engaged with two racks on said traction arms.

10. A safety tire device as defined in claim 9 wherein each of said actuators is disposed between two of said traction arms and is engaged with two racks disposed on opposite sides of said actuator.

11. A safety tire device as defined in claim 10 wherein said actuators are coupled to said pinion gears by T-drive connections.

12. A safety tire device as defined in claim 9 wherein each of said pinions is a double pinion engaging two racks on one of said traction arms.

13. A safety tire device as defined in claim 12 wherein said racks are formed by rows of slots in opposite edge portions of the traction arms.

14. A safety tire device as defined in claim 7 wherein said racks comprise rows of teeth formed on sad traction arms.

15. A safety tire device as defined in claim 11 wherein said shafts are flexible to accommodate lateral movement of the traction arms.

16. A safety tire device as defined in claim 1 wherein said traction arms are mounted on said body for radial movement thereon and are yieldable laterally on the body, and further including springs acting between said body and said traction arms to hold the traction arms yieldably in generally radical positions.

17. A safety tire device as defined in claim 1 including means defining hand holes in said traction arms adjacent said traction elements for manual movement of the arms.

18. A safety tire device as defined in claim 1 wherein said power actuators are linear actuators including generally radial spring coils extending outwardly from the actuators and connected to said traction arms to move the traction arms between said positions.

19. A safety tire device as defined in claim 1 wherein each of said traction arms is guided for generally radial movement in a first bracket on said body and a second bracket overlies the arm and carries a roller that is yieldably urged toward the arm, and further including a first annular series of springs between and first brackets yieldably positioning the first brackets on said body, and a second annual series of springs between said second brackets yieldably positioning the second brackets over the traction arms.

20. A safety tire device as defined in claim 18 wherein each of said traction arms is formed with an elongated longitudinal slot, and said rollers overlie said slots.

21. A safety tire device as defined in claim 1 wherein said power actuators are rotary motors mounted on said body alongside said traction arms and each having an output gear drivingly engaging a rack formed on one of the traction arms.

22. A safety tire device as defined in claim 1 wherein said traction arms are elongated spring coils and said traction elements are portions of said coils, said power actuators comprising cylinders for extending and retracting the spring coils and having nozzle outlets positioned on said body to be disposed alongside the tread portion of the tire for directing the coils onto said tread portions into the extended positions.

23. A safety tire device as defined in claim 22 wherein each of said actuators comprises a radially disposed cylinder attached to said body and having a radially outer end spaced inwardly from the tread portion of the tire and having an extension carrying a nozzle having an open end directed across the tread portion of the tire, said spring coils being extendable and retractable through said open ends of said nozzles.

24. A safety tire device as defined in claim 23 wherein said extensions are hollow spring coils.

25. A safety tire device as defined in claim 23 wherein said cylinders are selected from the group comprising hydraulic cylinders, electromagnetic solenoids, and rotary electric motors having screw mechanisms that produce linear output.

26. A safety tire device as defined in claim 22 wherein nozzles are L-shaped and said traction elements are free end portions of the spring coils.

27. A safety tire device as defined in claim 23 wherein said nozzles are Y-shaped, each having two open ends for extending and retracting two spring coils, and said spring coils are mounted at opposite ends in adjacent nozzles to be disposed generally along a chord of the periphery of the tire in the retracted position and to be disposed in a V-shaped active position across the tread portion of the tire in the extended position.

28. A safety tire device as defined in claim 1 wherein said device is mountable on the hub of a vehicle wheel and comprises:
a wheel rim mountable on the hub and having axially outwardly extending connectors thereon for connection to said body, said body comprising a cover secured to said connectors and a base plate mounted between said cover and said hub and supporting said power actuators, said traction arms being guided between said body and said wheel rim for movement between said positions.

29. A safety tire device as defined in claim 28 wherein said traction arms comprise arcuately curved elements generally following the curvature of the tire and guided into retracted positions in which the inner end portions of the elements are inside said wheel rim.

30. A safety tire device as defined in claim 29 wherein said wheel rim has first roller guides thereon positioned to receive and hold the inner ends of the traction arms in the retracted positions.

31. A safety tire device as defined in claim 30 wherein said cover has second roller guides therein engaging said traction arms in the extended positions and positioned to guide said traction arms into engagement with the first roller guides in the retracted positions.

32. A safety tire device as defined in claim 31 wherein said power actuators include drive pinions engaging racks on said traction arms between said first and second roller guides.

33. A safety tire device mountable on a vehicle wheel having a tire thereon with a tread portion for engaging a supporting surface, said device having, in combination:
a body mountable on the side of the wheel;
a plurality of generally radially extending traction arms having traction elements on the outer ends of said arms, said arms being mounted on said body for movement between retracted positions in which said traction elements lie alongside the tire and extended positions in which the traction elements overlie the tread portion of the tire;
rack-and pinion drive couplings for extending and retracting the traction arms, comprising racks formed in said traction arms and pinion gears mounted on said body and engaging said racks;
and power actuators mounted on said body and drivingly connected to said pinion gears and thereby connected to said traction arms to move the arms between said retracted and extended positions, each of said actuators being disposed between two of said traction arms and drivingly connected to two pinion gears for driving the two traction arms on opposite sides of said actuator.

34. A safety tire device as defined in claim 33 wherein said actuators are coupled to said pinion gears by T-drive connections.

35. A safety tire device mountable on a vehicle wheel having a tire thereon with a tread portion for engaging a supporting surface, said device having, in combination:
a body mountable on the side of the wheel;
a plurality of generally radially extending traction arms having traction elements on the outer ends of said arms, said arms being mounted on said body for movement between retracted positions, in which said traction elements lie alongside the tire and extended positions, in which the traction elements overlie the tread portion of the tire;

and electric motors mounted on said body and drivingly connected to said traction arms to move the arms between said retracted and extended positions and further including a battery pack connected to said electric motors and source of power, and a generator connected to said batter pack and responsive to the motion of the wheel to charge the battery pack.

* * * * *